(12) United States Patent
Atkinson et al.

(10) Patent No.: US 11,500,374 B2
(45) Date of Patent: Nov. 15, 2022

(54) INTELLIGENT MULTI-LEVEL SAFE AUTONOMOUS FLIGHT ECOSYSTEM

(71) Applicant: KUTTA TECHNOLOGIES, INC., Phoenix, AZ (US)

(72) Inventors: Michele Lee Atkinson, Johns Creek, GA (US); James A. Katlen, Peoria, AZ (US); Michael William Landreth, Peoria, AZ (US); Douglas V. Limbaugh, Phoenix, AZ (US)

(73) Assignee: KUTTA TECHNOLOGIES, INC., Phoenix, AZ (US)

( * ) Notice: Subject to any disclaimer, the term of this patent is extended or adjusted under 35 U.S.C. 154(b) by 112 days.

(21) Appl. No.: 17/087,854

(22) Filed: Nov. 3, 2020

(65) Prior Publication Data

US 2022/0137618 A1 May 5, 2022

(51) Int. Cl.
| | | |
|---|---|---|
| *G05D 1/00* | (2006.01) | |
| *G06N 20/00* | (2019.01) | |
| *B64C 39/02* | (2006.01) | |
| *H04L 9/40* | (2022.01) | |

(52) U.S. Cl.
CPC .......... *G05D 1/0022* (2013.01); *B64C 39/024* (2013.01); *G05D 1/0027* (2013.01); *G05D 1/0094* (2013.01); *G06N 20/00* (2019.01); *H04L 63/00* (2013.01); *B64C 2201/12* (2013.01)

(58) Field of Classification Search
CPC ............... G05D 1/0022; G05D 1/0027; G05D 1/0094; B64C 39/024; B64C 2201/12; G06N 20/00; H04L 63/00; H04L 9/00; H04L 29/02; H04W 4/00; H04W 4/30; H04W 4/46; H04W 4/70; H04W 4/90; H04W 12/00407; H04W 28/0215; H04W 28/0231; H04W 28/0846; H04W 28/18; H04W 28/16; H04W 36/24; H04W 48/18; H04N 1/32667; H04N 1/32683
See application file for complete search history.

(56) References Cited

U.S. PATENT DOCUMENTS

| | | | |
|---|---|---|---|
| 9,507,346 B1 * | 11/2016 | Levinson | G06F 3/04847 |
| 9,777,502 B2 | 10/2017 | Curlander et al. | |
| 10,042,359 B1 * | 8/2018 | Konrardy | G05D 1/0061 |
| 10,706,729 B2 | 7/2020 | Cao et al. | |
| 10,710,710 B2 | 7/2020 | Price | |

(Continued)

OTHER PUBLICATIONS

International Search Report and Preliminary Report on Patentability from corresponding Int'l Pat. App. PCT/US2021/048304, dated Dec. 1, 2021 (11 pp.).

(Continued)

*Primary Examiner* — Michael Won
(74) *Attorney, Agent, or Firm* — Holland & Hart LLP

(57) ABSTRACT

A communications ecosystem and related methods of operation include an ecosystem safety level (ESL), a plurality of vehicles or systems, each vehicle or system having an individual safety level (ISL), a control system operable to determine whether the ISL for each vehicle or system meets or exceeds the ESL, and one or more communications links between any first vehicle or system having a first ISL that does not meet or exceed the ESL and a second vehicle or system with a second ISL that does meet or exceed the ESL such that the first vehicle or system operates at the second ISL.

15 Claims, 13 Drawing Sheets

(56) References Cited

U.S. PATENT DOCUMENTS

| | | | |
|---|---|---|---|
| 2014/0141769 A1* | 5/2014 | Brisebois | H04W 4/021 |
| | | | 455/437 |
| 2014/0281534 A1* | 9/2014 | McCormack | H04L 63/0428 |
| | | | 713/168 |
| 2015/0032293 A1* | 1/2015 | O'Neill | B60W 50/029 |
| | | | 701/2 |
| 2015/0036514 A1* | 2/2015 | Zhu | H04W 52/38 |
| | | | 370/252 |
| 2015/0293845 A1 | 10/2015 | Hsu et al. | |
| 2016/0155339 A1 | 6/2016 | Saad et al. | |
| 2018/0136651 A1* | 5/2018 | Levinson | B60W 30/00 |
| 2018/0231977 A1* | 8/2018 | Uno | B60W 10/04 |
| 2019/0011912 A1* | 1/2019 | Lockwood | G05D 1/0027 |
| 2019/0186918 A1 | 6/2019 | Suen et al. | |
| 2020/0012274 A1* | 1/2020 | Kamiya | B66F 9/0755 |
| 2020/0020412 A1 | 1/2020 | Biberidis et al. | |
| 2020/0266857 A1* | 8/2020 | Hwang | H04L 5/0055 |
| 2020/0314916 A1* | 10/2020 | Park | H04W 74/0833 |
| 2020/0404569 A1* | 12/2020 | Cho | H04W 76/18 |
| 2021/0061027 A1* | 3/2021 | Da Deppo | G06N 20/00 |
| 2021/0206382 A1* | 7/2021 | Nakada | G01C 21/387 |
| 2022/0089181 A1* | 3/2022 | Gross | G05D 1/0011 |
| 2022/0126864 A1* | 4/2022 | Moustafa | B60W 60/001 |

OTHER PUBLICATIONS

Schmitt et al., "Perception-Oriented Cooperation for Multiple UAVs in a Perception Management Framework," 2016 IEEE/AIAA 35th Digital Avionics Systems Conference (DASC), pp. 1-10, 2016 (10 pp.).

\* cited by examiner

INTELLIGENT MULTI-LEVEL SAFE AUTONOMOUS FLIGHT ECOSYSTEM

STATEMENT REGARDING FEDERALLY SPONSORED RESEARCH OR DEVELOPMENT

This invention was made with government support under Contract No. W911W619C0070 awarded by U.S. Army Contracting Command. The U.S. government has certain rights in the invention.

BACKGROUND

The following relates generally to unmanned aircraft vehicles (UAVs) and related systems (UASs) for managing unmanned vehicles, and security considerations related to same.

The technology platforms available for unmanned solutions are quickly becoming mature and more reliable. Artificial Intelligence and Machine Learning (AI/ML) algorithms are quickly becoming "smarter" and more reliable. With the increased acceptance of unmanned platforms and a surge in the capabilities and accuracy of data analytics in the commercial marketplace as well as significant achievements in AI/ML performance in robotics, there is expected to be a desire to move the AI/ML capabilities to unmanned aircraft systems (UASs). One problem with the introduction of AI/ML in UASs is that airworthiness certification is required for the unmanned vehicle to fly in the National Airspace System (NAS). Even when designated for use in the battlefield, the U.S. military requires an airworthiness certification before the UAS can be fielded. There are at least two main reasons airworthiness certification is a problem for UASs commanded by AI/ML algorithms. First, the certified software needs to behave in a deterministic manner, but AI/ML outputs are inherently not deterministic. Second, even if there was a way to convince certification authorities to allow autonomous flight guided by non-deterministic software, the certification requirements would likely be cost prohibitive. In addition to being cost-prohibitive to certify, the smaller UAS platforms would likely not be viable to produce and use because of the redundant equipment requirements (i.e., the UAS would be too heavy to fly).

Small UAS platforms may provide the most utility to commercial and military markets. In commercial applications, small UASs can be customized to individual task, for example, for package delivery, security/surveillance, mobile communication relays, and so on. In military applications, small UASs can be customized to support missions for target detection, target identification, electronic warfare, decoy operations, and self-sacrifice (anti-aircraft weapons, helicopter mines, etc.).

In commercial markets, AI/ML and autonomous operations continue to be aggressively tested (e.g., self-driving cars and delivery drones). Existing UAS platforms without AI/ML algorithms are already in use, but those applications are mainly GPS navigation applications that have an extremely limited scope or are used in areas of the world that do not have airspace restrictions. In military markets, the U.S. military is currently executing research projects involving AI/ML algorithms for manned/unmanned teaming (MUM-T) for the future battlefield. There is an increasing need in UAS platforms that are commanded by AI/ML algorithms, but the problem of how to certify a UAS with non-deterministic software has not been solved.

SUMMARY

One aspect of the present disclosure relates to an Intelligent Multi-level Safe Autonomous Flight Ecosystem (IMSAFE) architecture. The IMSAFE architecture may employ a concept of safety levels. The safety levels may be defined as, for example, levels 1-5, with 1 being the least safe and 5 being the most safe. The safety level definitions are intended to be application specific and scalable to any number of levels. A safety level can be either a single number that is an aggregate of the required functional capabilities needed, or there can be multiple safety levels, one for each functional capability. For example, one scenario may be to define a safety level of 4 to mean the inclusion navigation capability and vehicle and terrain avoidance capability. A second scenario may be to define a set of dissimilar safety levels like a navigation capability with a safety level of 3 and vehicle and terrain avoidance capability of 5. When safety levels are discussed, no inferences should be made that constrain the definition of the level to be an aggregate safety level or a set of various safety levels.

The IMSAFE architecture may employ different types of safety levels. For example, there may be an Ecosystem Safety Level (ESL), and each member of the ecosystem may have an Individual Safety Level (ISL). The ESL identifies the safety level(s) required for safe participation in the ecosystem (i.e., an operational area). The ISL identifies the safety level(s) related to an individual member's capabilities. If an individual member (M1) has a defined ISL equal to or greater than the required ESL, M1 can operate safely in the ecosystem. If not and M1 can communicate, directly or indirectly, with member 2 (M2) and M1 and M2 can collaborate to meet or exceed the required ESL to allow M1 to operate safely in the ecosystem. If the collaboration between M1 and M2 occurs, M1's ISL is said to be promoted. If a member with a promoted ISL loses the ability to collaborate with another member that enabled promotion, the member's promoted ISL will be demoted. A member's ISL can also be demoted due to external or internal factors resulting in the degradation of its functional capabilities.

When implementing IMSAFE, the ecosystem needs to be defined. The definition of the ecosystem is intended to be scalable and may depend on specific operational environments or scenarios or it may mirror an existing environment such as the National Airspace System (NAS). An example ecosystem may consist of multiple vehicles, equipment, human operators, and other autonomous agents operating in the same geographical area working together to accomplish a common mission, goal, or task. An ecosystem of human participants collaborating with autonomous software for decision making and mission or task assignment is referred to as Manned-Unmanned Team (MUM-T). ESL(s) and ISL(s) for different operational scenarios may be defined differently even though the same ecosystem members are included. For example, the ESL(s) and ISL(s) may differ based on, but not limited to, geographic region, time of day, atmospheric conditions, or military versus commercial operations. Additionally, IMSAFE implementation may include multiple ecosystems with dissimilar ESLs adjacent to one-another with some members being members in one or more of the adjacent ecosystems.

Systems and method for secure communications are disclosed. One aspect of the present disclosure relates to a method for secure communications within a defined communications ecosystem, the ecosystem having an ecosystem safety level (ESL), a plurality of vehicles or systems existing in the ecosystem. The method includes determining whether a first individual safety level (ISL) for a first vehicle or system in the ecosystem is equal to or greater than the ESL. If the first ISL does not meet or exceed the ESL, the method further includes providing a communication link between the first vehicle or system and a second vehicle or system of the ecosystem. The second vehicle or system has a second ISL, and the second ISL is equal to or greater than the ESL. The method further includes operating the first vehicle or system in a safe operating mode with the first ISL being at least equal to the ESL because of the communication link between the first vehicle or system and the second vehicle or system.

The method may further include at least periodically recalculating the first ISL, the second ISL, and the ESL, and modifying the communication link if the first ISL becomes equal to or greater than the ESL, or the second ISL becomes less than the ESL. The ESL may be based on at least one of operating conditions, needs, capabilities, terrain, restrictions, and availability. The method may include automatically disconnecting the communication link if the ESL is equal to or less than the first ISL. The method may include invoking a predetermined action for the first vehicle or system if the first ISL does not meet or exceed the ESL and the communication link is not created. The method may include determining the first ISL using at least one of health status, authority, capability, and environment. A health status may include at least one of communication signal strength, built-in-test results, and real-time vehicle performance. Authority may include at least one of team leader status, team member status, lost communications status, Capability may include at least one of promotion/demotion enabled, maneuverability, sensor/payload/weapons, and energy/fuel requirements and reserves. Environment may include at least one of altitude, climate or terrain, and atmospheric conditions/weather.

Another aspect of the present disclosure relates to a communications ecosystem that includes an ecosystem safety level (ESL), a plurality of vehicles or systems, each vehicle or system having an individual safety level (ISL), a control system operable to determine whether the ISL for each vehicle or system meets or exceeds the ESL, and one or more communications links between any first vehicle or system having a first ISL that does not meet or exceed the ESL and a second vehicle or system with a second ISL that does meet or exceed the ESL such that the first vehicle or system operates at the second ISL.

The ecosystem may include a human override capability that controls the one or more communications links. The ecosystem may further include a controller configured to determine when to create or eliminate the one or more communications links based on a real-time status of the ESL and the first and second ISLs. The ESL and the first and second ISLs may be independently variable, and the one or more communications links may be automatically controlled based on real-time comparisons of the ESL with the first and second ISLs. The first vehicle or system may operate based on one or more predetermined conditions when disconnected from the second vehicle or system.

A further aspect of the present disclosure relates to a communications system that includes a first ecosystem having a first ecosystem safety level (ESL), a second ecosystem having a second ESL, a first vehicle or system having a first individual safety level (ISL), the first ISL being less than the first ESL, a second vehicle or system having a second ISL, the second ISL being equal to or greater than the first ESL, and a first communications link between the first vehicle or system and the second vehicle or system that promotes the first ISL to be equal to the second ISL to provide safe operation of the first vehicle or system in the first ecosystem.

The system may include a third vehicle or system having a third ISL, wherein the third ISL is equal to or greater than the second ESL, and a second communications link between the first vehicle or system and the third vehicle or system that promotes the first ISL to be equal to the third ISL to provide safe operation of the first vehicle or system in the second ecosystem. The first communications link may be disconnected if the first ISL increases to be equal to or greater than the first ESL or the second ISL drops below the first ESL. The second communications link may be disconnected if the first ISL increases to be equal to or greater than the second ESL or the third ISL drops below the second ESL.

DETAILED DESCRIPTION

Figure 1:
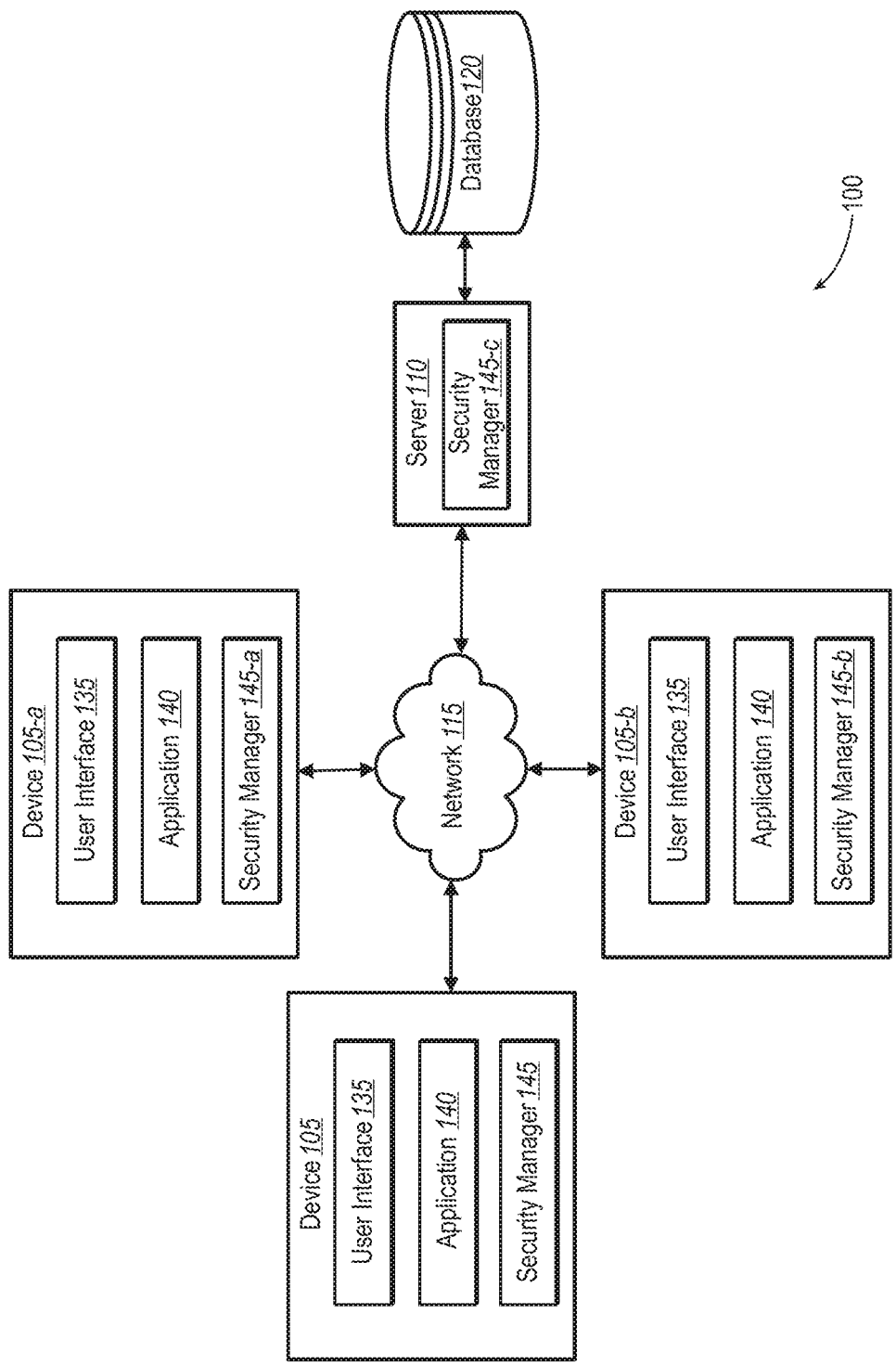
FIG. 1 illustrates an example of a communications ecosystem in accordance with aspects of the present disclosure, wherein the diagram represents a generalization of the types of entities in the ecosystem.

The present disclosure relates to an Intelligent Multi-level Safe Autonomous Flight Ecosystem (IMSAFE) architecture, such as a software system, which may be part of or define a communications ecosystem. The IMSAFE architecture may enable collaboration of distributed systems (e.g., an ecosystem) to work together to ensure safety while Artificial Intelligence/Machine Learning (AI/ML) algorithms are operating. Multi-level Safety provided by IMSAFE architecture may include dynamic promotion and demotion of safety levels. The safety levels may be assigned to individual functionality (e.g., the system/platform can have multiple functions and can provide dissimilar safety levels). The IMSAFE architecture may provide resource sharing of safety-critical functionality and data with trusted sources. The IMSAFE architecture may provide reduction development, testing, and approval costs by leveraging existing systems/platforms with previously approved (i.e., "trusted") safety-critical functionality, communication interfaces, and/or data processing algorithms. The IMSAFE architecture may also provide reduced cost barrier to market entry for innovative, relatively low-cost autonomous systems/platforms that benefit society since ecosystem may ensure safety rather than requiring each individual system/platform to address all required aspects of safety.

An ecosystem may be or include a defined, holistic environment within which participating vehicles and/or platforms may operate. Individual functionality available in the ecosystem may be assigned an Ecosystem Safety Level (ESL) based on many factors such as operating conditions, needs, capabilities, terrain, restrictions, availability, and so on. It is possible that the same vehicles/platforms can have different ESL values in different Ecosystems (e.g., controlled airspace vs. non-controlled airspace). Similarly, the vehicle/platform may have an Individual Safety Level (ISL) assigned to each capability and/or functionality. The ISL values are scored based on vehicle/platform factors such as capability, performance, types of autonomy algorithms running, the existence of previously approved/certified software, Technology Readiness Level (TRL), and so on. At a minimum, the ISL typically is equal to the ESL for the vehicle/platform to participate in the defined Ecosystem. If the ISL does not meet or exceed ESL, capabilities and functionalities in other vehicles/platforms in the Ecosystem can be used to bring the ISL up to the required ESL. If ISL>ESL, the vehicle/platform is said to be operating at ISL=ESL (i.e., capped). If operating at a capped ISL=ESL and ESL is promoted, the vehicle/platform is still safe providing ISL=ESL can be achieved (i.e., capped or uncapped).

The ISL and ESL may be continuously recalculated during operation within the Ecosystem. If ISL does not meet or exceed ESL during operation, a predetermined course of action (i.e., a playbook) for the vehicle/platform may be invoked. ISL and ESL can be promoted or demoted during operation. In a given Ecosystem, ISL typically cannot exceed the required ESL. If ISL is greater than required ESL for any participant in the Ecosystem, the predetermined course of action will take that into account whenever ISL=ESL.

The present disclosure includes a number of system-level features including human-in-the-loop/human-on-the-loop functionality that provides a path for a single operator supervised in full multiple manned and unmanned platforms. A distributed autonomy ("a la carte" autonomy) and protection may include control, monitoring/feedback, tasking, approval "voting", and vehicle and sensor control based on the fusion of safety-critical data from other platforms and certified systems. Playbook reversion may include reverting to a preloaded, deterministic "playbook" when experiencing, for example, lost communications, GPS is denied, or when a critical system in the ecosystem is inoperative or experiences a degradation of performance. A multilevel autonomous operation may include a layered approach of various levels that enable, restrict or prevent use of AI/ML algorithms.

Platform-level highlights include, for example, a promotion/demotion of authorization levels, wherein platform constraints are removed or added depending on availability of airspace, communications, navigation, UAS, and installed sensor help status. Safe Airspace Volume (SAV) may ensure UAS flightpath remains within a defined airspace set of restrictions. A scheduled autonomy may include enforcement of temporal constraints and deterministic sequencing of AI/ML algorithms. A partitioned or redundant data bus may include high-TRL and safety-critical data that is either physically separated or its integrity is independently validated.

System integrity aspects of the present disclosure may include cybersecurity, wherein outermost layer of architecture protects against unauthorized access. Functional partitions may include boundaries between high-confidence and low TRL AI/ML algorithms and high TRL and/or certified software.

In one scenario, airworthiness approval is available for a DO-178C based Safe Airspace Volume (SAV)/Keep-in-algorithm (KIA) concept to achieve Level of Interoperability (LOI) 4 control of a UAS. The concept involves the creation of a three dimensional volume (the SAV) that accounted for known terrain and obstacle clearance as well as known altitude and airspace restrictions. The SAV may include a safety boundary to ensure the UAS can maneuver within its flight envelope near the edge of the SAV while remaining safely inside. When calculating a flight plan (e.g., series of waypoints) for the UAS, waypoints may be fed to the KIA to verify the calculated flight plan (or task) can be completed while keeping the UAS inside the SAV. The SAV/KIA may be useful since LOI 4 operations allowed the user to control the altitude and airspeed of the UAS, but the user may not have appropriate qualifications to fly the UAS unsupervised.

For current UAS operations, the ground control station (GCS) may have a qualified pilot acting as pilot in command of the UAS. A user, sometimes referred to as the supervised user, may coordinate via, for example, radio to the GCS to initiate a request to take control of the UAS. Assuming the supervised user's control unit is included in a preloaded schedule on the UAS and is within their scheduled time window, the supervised user would be granted control of the aircraft and its payload by the supervising controller (i.e., in the GCS). This may require pre-planning, coordination, and special equipment for the supervised user. The supervised user scenario may work, for example, for a soldier on the ground, but when a qualified air crew needs to take control of the UAS to laser designate a target and/or fire weapon, the SAV/KIA may be restrictive for the manned/unmanned teaming (MUM-T) environment. Modifications to software supporting the Army's Interoperability Profile (IOP) specifications may be required to support MUM-T. Since qualified and non-qualified users can typically use the radio and negotiate usage of the UAS, the next step in the evolution of the architecture may be the remote supervised user (RSU). The RSU allows for the supervised user to sublease their level of control of the UAS without requiring the device gaining control to be in an authorization schedule or even on the same radio network as the GCS. In some scenarios, the GCS operator, which may be referred to as the supervised controller, is able to take back control even though it was sublet. This evolutionary step allowed, for example, individual users with computers connected to the Army's Secret Internet Protocol Router Network (SIPRNet) to command and control the UAS.

Further applications for MUM-T operations are possible with more emphasis on allowing AI/ML software to make autonomous decisions in anti-access/area denial (A2AD) during peer on peer conflicts while coordinating mission plans and status with the future fleet consisting of, for example, a combination of manned and unmanned attack helicopters and air launched effects (ALEs). The platform software may include autonomous software running on the UAS, ALEs, and the Future Vertical Lift (FVL) aircraft. All of these platforms may work together to identify and attack threats and proceed to the engagement area with an intent of reducing workload, for example, for an Air Weapons Team Lead (AWT-L).

The platform autonomy may perform automatic target recognition, objective/task-based assignments, dynamic contingency planning based on vehicle and communication health, and so on while maintaining safe autonomous flight. This new environment may include the autonomous agents on the FVL, ALEs, and UASs to communicate and coordinate with each other and use AI/ML software plan and execute tasks/objectives with and without human involvement. The solution may be architected so it is airworthy, and there may be a constraint that ALEs are expendable, low cost air vehicles that contain different payload configurations. Since the ALEs typically fly low to the ground (i.e., maybe even in a terrain avoidance mode), the ALEs may be part of the active battlefield (i.e., they do not just fly around at high altitudes taking video), ALEs and other platforms may require AI/ML planning agents, and all autonomous platforms may be flying in close proximity. As such, the overhead and static nature of the SAV/KIA and preloaded authorization schedules may not be sufficient to support the ALE in the future battlefield.

The present disclosure may relate to software architecture that includes multiple safety levels that allow (or prohibit) autonomous flight based on capabilities, air vehicle status/health, location, and weapons release authorization. Further, the functionality required to achieve airworthiness certification may be distributed between platforms (including ground platforms) to allow for safe, autonomous flight. For example, a non-deterministic ALE may be configured to calculate a flight plan and a UAS with certified, safety-critical software may collaborate with a ground station with safety-critical software that can intervene if the calculated route is not acceptable. Likewise, decision making capabilities and the assignment of safety levels may be distributed throughout an ALE team that is on a mission which is out of contact with the supervising controller that launched the ALEs or in a GPS denied area to provide the necessary redundancy for safe, autonomous flight. This new architecture and software may be referred to as the Intelligent Multi-level Safe Autonomous Flight Ecosystem (IMSAFE) architecture mentioned above.

In current markets, IMSAFE architecture may address some of the certification problems with UASs being used for deliveries and for autonomous software being developed for such programs as the Army's Advanced Teaming project to demonstrate autonomous behaviors in a MUM-T environment. The problem may be solved at least in part using IMSAFE architecture since distributed systems utilize a multi-layered safety architecture that allows the smaller UASs to use AI/ML software and less expensive hardware for obstacle detection (e.g., lidars and/or EO/IR cameras) that will enable longer flights at lower altitudes without the need to specifically certify the AI/ML software on the UAS. At least some of the UASs used for deliveries currently rely on known data (e.g., GPS location and published terrain and obstacle height) and flight paths that have to be pre-planned. The reliance on known data restricts delivery companies to operate in a static environment (e.g., no other aircraft, no unplanned terrain or obstacles). Although GPS will enable planned flight routes that inherently de-conflict other air traffic, the restriction of a static environment means UASs typically cannot be used over a larger geographical area. This is because new obstacles (e.g., houses, radio towers, buildings, etc.) can "pop up" at any time. The static environment restriction means the operational area for the UAS has to be well known and unlikely to change over time or else the UAS has to fly high over the terrain while in the enroute phase.

In the commercial market, the higher flight routes may cause conflicts in the NAS that require relatively expensive avionics and ground equipment to resolve. In the military market, the need to fly higher may exceed the ALEs fight performance and may cause errors. The higher flight may also jeopardize war fighters since the UASs may be easier to spot and either give away a war fighter's position or cause an asset that provides critical mission data to be lost.

There are several examples of the limitations for UAS operations because of the certification problem. In October of 2019, the FAA approved a large parcel delivery company to use drones to deliver medical packages to locations on a large medical campus. This illustrates the constraints for the UAS in the NAS. An example of operations only possible in a larger, static geographical area is illustrated with a company that uses a UAS to deliver vital medical supplies to remote villages in other countries where manned vehicle travel is not possible or practical for delivery of life saving supplies. The operational areas for this company have sparse populations and exist in areas where it is unlikely that a building or radio tower will "pop up" and the UAS can fly high over terrain without conflicting with other air traffic. For companies such as these to deliver in large geographical areas within the U.S., the UASs will need to be able to fly a known route while detecting and maneuvering around unknown obstacles and make contingency decisions. This creates a problem because cost constraints, weight, and power technologies exist to do this, but the AI/ML algorithms and equipment needed are not certifiable. With IMSAFE architecture, companies wanting to fly UASs in the NAS can make a low cost, small UAS platform a viable solution. The IMSAFE architecture provides a stable platform for certification activities that can be leveraged for an unrestricted UAS fleet.

Airworthiness certification is currently granted using a specific system of software components. Although the software components that implement safe, autonomous flight execution can be distributed, all components in the distributed system may be installed on the air vehicle. With IMSAFE architecture, the functionality required to provide safe, autonomous flight execution can be distributed to different systems including systems on other air vehicle platforms and systems on ground platforms. These systems may include systems with existing airworthy software thus reducing the overall cost of the system and keeping the UAS cost down. Leveraging distributed systems containing existing certified software and architecting multiple safety-levels, the UAS can use non-deterministic AI/ML software to perform its required task while maintaining safe, autonomous flight execution. Since the architecture of IMSAFE architecture leverages existing RSU technology, there may be an inherent safety feature since control of the UAS being commanded by non-deterministic AI/ML software can always be taken back by a supervisor (e.g., human or AI/ML) if errant operation is planned or observed.

The IMSAFE architecture can also support multiple, non-redundant data sources. IMSAFE architecture utilizes, for example, SNC TRAX® to distribute J-series, K-series, or CoT data in the multi-level safety architecture to eliminate reliance on one particular interface position reporting, tasking, point of interest identification, and proliferation of sensor data. Using multiple data formats and non-redundant data from various sources with, for example, SNC TRAX® enables IMSAFE architecture to obtain the necessary data to allow "dumb" UAS platforms with AI/ML software to perform safe, autonomous flight execution. To more safely accommodate the dynamic environment for the enroute phase in commercial applications or any flight phase in military applications, the IMSAFE architecture may include the ability for the dynamic promotion or demotion of safety levels. This allows the UAS platform software to utilize trusted data from distributed sources along with local parametric data such as UAS health (e.g., fuel, power, built in test failures, etc.), navigational health (e.g., GPS signal strength), and weapons stores to better ensure continued safe, autonomous flight execution.

The safety level can be determined and/or demoted/promoted through collaboration voting in distributed platforms, which may or may not be all air platforms. An integral part of the multi-level safety architecture and its safety level promotion/demotion capabilities may be the ability to collect position data from disparate networks and "dumb" UASs for safety level demotion/promotion and, if necessary, authorizations for non-flight related safe operations that are prevalent in the MUM-T scenario (i.e., thus making it safe MUM-T operations).

An example of an implementation of IMSAFE architecture with safety level demotion/promotion is the use of a simple cursor on target (CoT) message for platform position and mesh radio connection. If a manned Future Vertical Lift (FVL) and the Air Launched Effects (ALEs) it launches are within close proximity of each other but out of communication with each other (i.e., the ALEs are within communication proximity of each other, but not all ALEs are within communication proximity of the FVL), the "dumb" ALE can output its position and give status on its AI/ML computed mission/task that is relayed through another member of the ALE team to the certified software in the FVL where deterministic decisions can be made. For example, in a non-flight safety example, a weapons enabled UAS in a MUM-T scenario in which the UAS loses communications with a supervising controller or its control is gained by a supervised user who is not trained for weapons release can have its safety level demoted to a lower safety level until communication is regained or the supervised user is a different user (or autonomous agent) qualified to release weapons or use the laser designator.

These MUM-T scenarios enabled by the IMSAFE architecture are unique since they use a multi-level safety approach that allows for distributed software components with existing airworthiness certifications to collaborate and allow AI/ML to control ALEs or other UAS platforms with non-deterministic software initiating the command and control. Existing software architectures employ a "traditional" single layered safety approach with onboard redundancy required. The IMSAFE architecture may enable distributed, non-redundant systems to collaborate and create a flight environment where uncertified, non-deterministic AI/ML software can command and control the UAS while still maintaining a safe, autonomous flight execution.

FIG. 1 illustrates a block diagram illustrating one example of a communications ecosystem 100 in which the present systems and methods may be implemented. For example, the communications ecosystem may be an example of general communication and computing hardware, regardless of the domain (e.g., aerospace domain) the ecosystem is situated in. In some examples, the systems and methods described herein may be performed on a device (e.g., device 105). As depicted, the ecosystem 100 may include a device 105, a server 110, a network 115, and a database 120. The network 115 may allow the device 105, the server 110, the database 120, and other components of the ecosystem 100 to communicate with one another.

Examples of the device 105 may include any combination of, for example, mobile devices, computers, communications equipment, airborne or ground vehicles, satellites, or any combination thereof.

Examples of server 110 may include, for example, a data server, a cloud server, proxy server, mail server, web server, application server, database server, communications server, file server, home server, mobile server, name server, or any combination thereof.

In some configurations, the device 105 may include a user interface 135, application 140, and security manager 145. Although the components of the device 105 are depicted as being internal to the device 105, it is understood that one or more of the components may be external to the device 105 and connect to device 105 through wired or wireless connections, or both. Examples of application 140 may include a web browser, a software application, a desktop application, a mobile application, etc. In some examples, application 140 may be installed on another component of ecosystem 100, such as one of the device 105-*a* or 105-*b*, security manager 145, server 110, or database 120. Although device 105 is illustrated with an exemplary single application 140, in some examples application 140 may represent two or more different applications installed on, running on, or associated with device 105.

In some examples, device 105 may communicate with server 110 via network 115. Examples of network 115 may include any combination of cloud networks, local area networks (LAN), wide area networks (WAN), virtual private networks (VPN), wireless networks (using 802.11, for example), cellular networks (using 3G, LTE, or 5G, for example), etc. In some configurations, the network 115 may include the Internet. In some examples, the device 105 may not include security manager 145. For example, device 105 may include application 140 that allows device 105 to interface with a separate device via security manager 145 being located on another device such as a computing device or server 110 or database 120, or any combination thereof.

In some examples, at least one of device 105, server 110, and database 120 may include security manager 145 where at least a portion of the functions of security manager 145 are performed separately or concurrently on device 105, server 110, database 120, or other device of ecosystem 100. In some examples, a user may access the functions of device 105 (directly or through device 105 via security manager 145) from another one of the devices 105-*a*, 105-*b*, or server 110, or database 120. In some examples, devices 105 may include a mobile application that interfaces with one or more functions of device 105, security manager 145, or server 110, or database 120.

In some examples, server 110 may be coupled to database 120. Database 120 may be internal or external to the server 110. In one example, device 105 may be coupled to database 120. In some examples, database 120 may be internally or externally connected directly to device 105. Additionally or alternatively, database 120 may be internally or externally connected directly to device 105 or one or more network devices such as a gateway, switch, router, intrusion detection system, etc.

Figure 2:
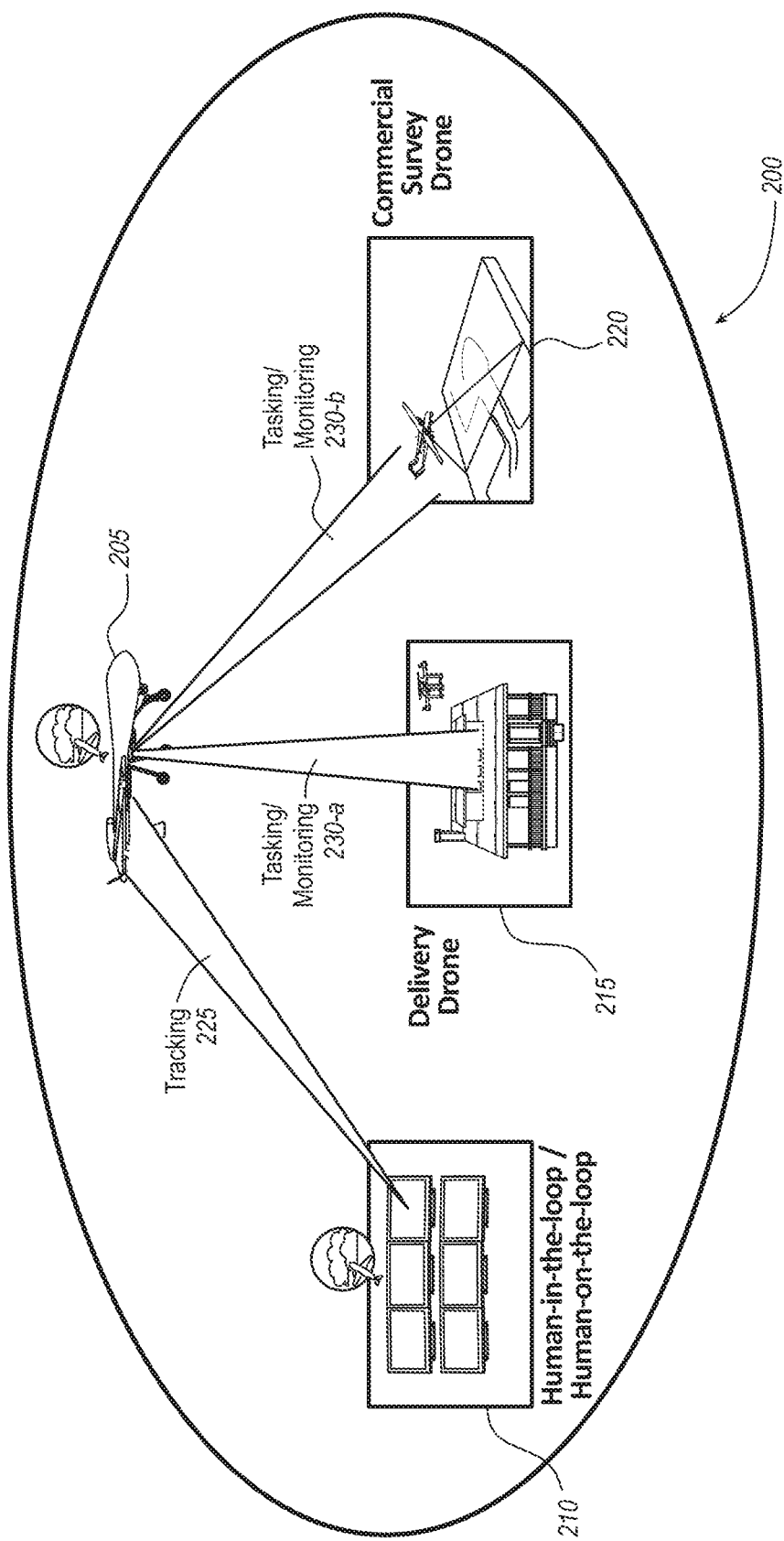
FIG. 2 illustrates another example communications ecosystem in accordance with aspects of the present disclosure, wherein the ecosystem may be an example of a viable commercial domain.

FIG. 2 illustrates an ecosystem 200 that may be one example of the ecosystem 100, or components thereof, described with reference to FIG. 1. In at least one example, the ecosystem 200 is a situated example in one possible commercial domain. The ecosystem 200 includes a vehicle or device 205 that may be one example of the device 105 described above with reference to FIG. 1. The ecosystem 200 may also include a human-in-the-loop 210, a delivery drone 215, a commercial survey drone 220. The vehicle 205 may receive tasking communications 225 from the human-in-the-loop or human-on-the-loop 210. The vehicle 205 may provide tasking/monitoring communications 230-a with the delivery drone and 230-b with the commercial survey drone 220.

The ecosystem 200 may be one example of a distributed autonomy system that provides task relay, safety monitoring, multi-level autonomous operations, and distributed data. In at least some examples, the delivery drone 215 and commercial survey drone 220 may, by themselves, have relatively low levels of security and related security certifications. By coupling via the tasking/monitoring 230 with the vehicle 205, the security levels of the delivery drone 215 and commercial survey drone 220 may be upgraded, at least temporarily, while a communication link exists with the vehicle 205.

Figure 3:
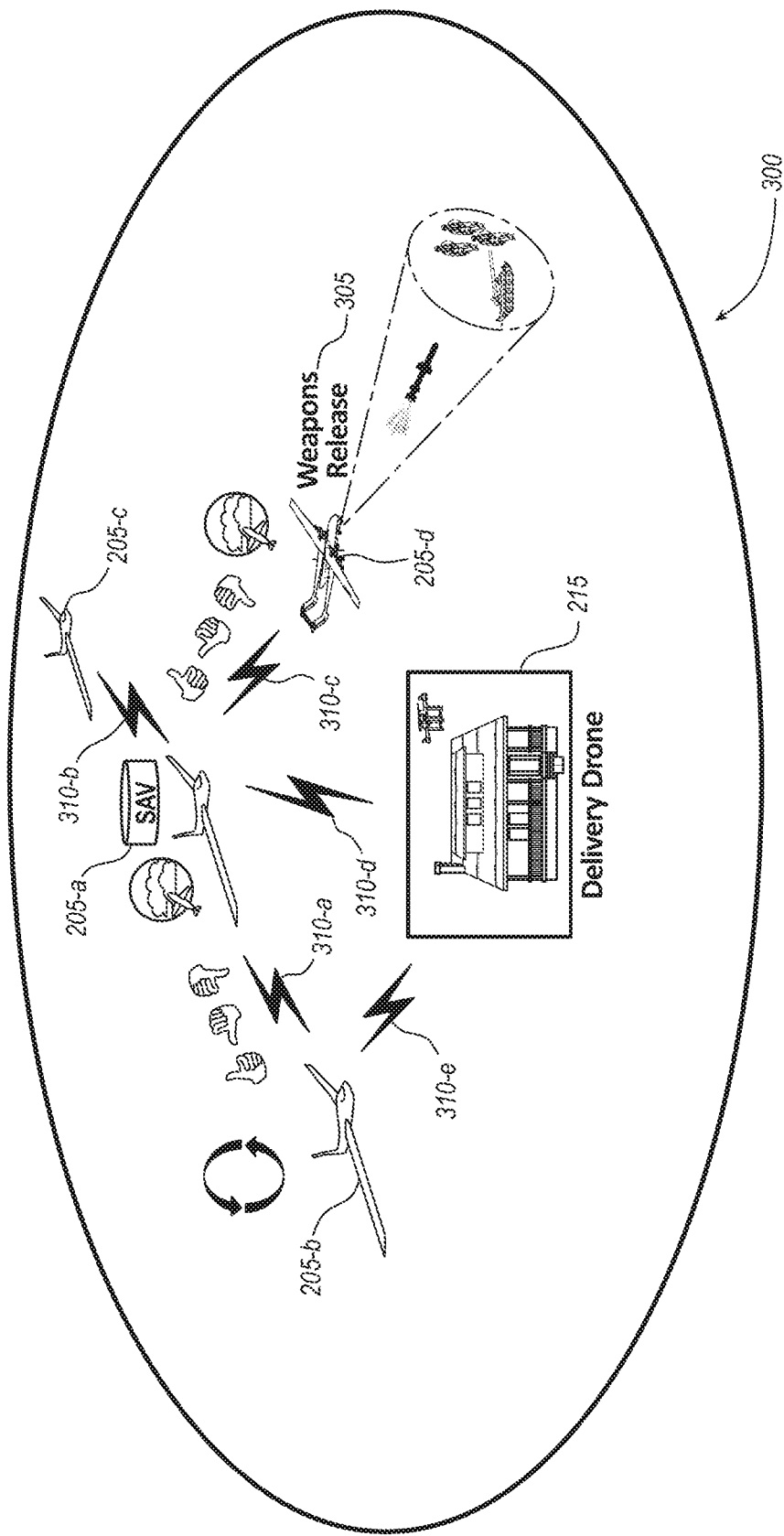
FIG. 3 illustrates another example of a communications ecosystem in accordance with aspects of the present disclosure, such as an expansion of the ecosystem to be situated among larger governance that crosses into, for example, both civil and military domains.

FIG. 3 shows another example ecosystem 300 that may be one example of the ecosystem 100, or components thereof, described with reference to FIG. 1. The ecosystem 300 may be an example of application of the inventive ideas disclosed herein to the commercial sector and military applications, and an intersection with governance of airspace in general. The ecosystem 300 includes a plurality of vehicles or devices 205-a-d, which may be examples of the devices 105 described above with reference to FIG. 1. The ecosystem 300 may also include a delivery drone 215, a weapons release 305, and a plurality of communication links 310-a-e provided between the vehicles 205-a-d and/or the delivery drone 215.

The ecosystem 300 may be one example of a distributed autonomy system. The system shown in FIG. 3 may provide voting between platforms, such as various TRL algorithms, distributed functionality for safe flight, lost communications, and command/navigation related to SAV, weapon systems (military), and package drop (commercial).

In the ecosystem 300, any one of the vehicles 205-a-d and a delivery drone 215 may have a relatively low level of security or security certification. By providing communication link 310-a-e and other measures, the security level of any one of the vehicles 205-a-d and delivery drone 215 may be elevated to a higher level of security, such as the security level of any one of the other vehicles 205-a-d to which a communication link 310-a-e is available.

In at least some examples, one of the communication links 310-a-e may be lost and/or a GPS connection denied for any one of the vehicles 205a-d. In such circumstances, the ecosystem 300 may revert to a preloaded "playbook" for the system for any one of the vehicles 205-a-d or delivery drone 215. The preloaded playbook may include, for example, a safe altitude, a safe speed, or a safe route. In a lost communications and/or a GPS denied scenario, the autonomy level for the vehicle may be demoted. Further, there may be continuous attempts to collaborate and/or connect with other vehicles using, for example, a shared status, synchronized routes, or communications relay whenever the denial or lost communications is resolved.

Figure 4:
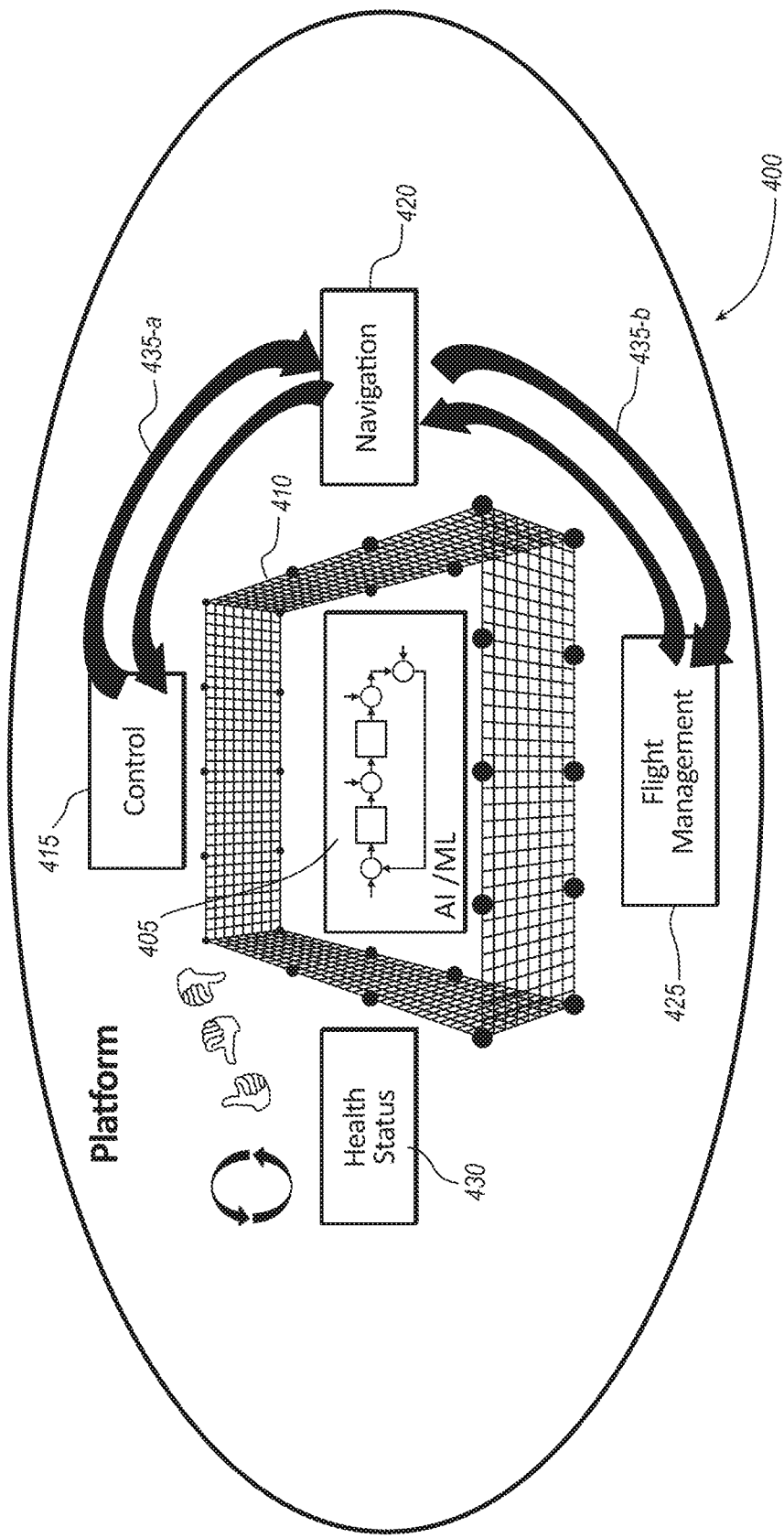
FIG. 4 illustrates an example communications platform in accordance with aspects of the present disclosure, where the ecosystem introduces further security aspects.

FIG. 4 shows an example platform for use with one or more of the example ecosystems disclosed herein. The platform of FIG. 4 may progress the idea of the ecosystems disclosed herein being made up of platforms, and platforms needing safety and security measures that allow a platform with certified subsystems to host an experimental system in a safe and bounded way. The platform 400 includes AI/ML system capability 405 that is surrounded by a security fence 410. The platform 400 further includes control 415, navigation 420, flight management 425, and health status 430. At least some of the control 415, navigation 420, and flight management 425 may be connected with communications links 435-a and 435-b that provide communication therebetween. The AI/ML 405 may be figuratively fenced off or protected from the control 415, navigation 420, flight management 425, and other aspects of the platform 400.

The platform 400 may be one example of a partitioned autonomy. The partitioned autonomy may include, for example, a data bus, functional partitions, airspace constraints, timing constraints, a separate functionality, and autonomy scheduler. The separate functionality may include, for example, control monitoring/feedback loops, tasking, execution, voting, payload/sensors, and the like.

Figure 5:
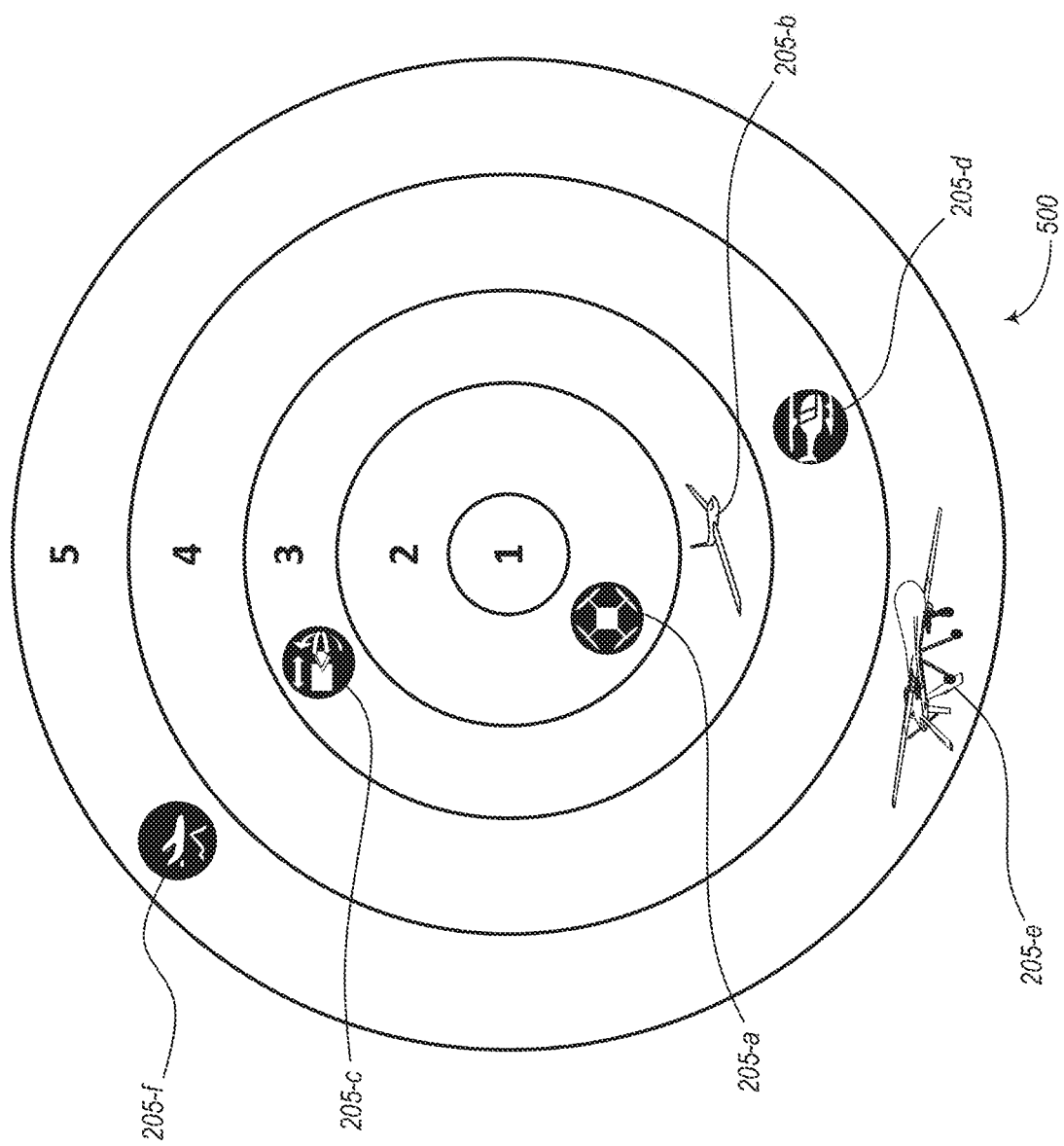
FIG. 5 is a schematic representation of safety levels of an example communications ecosystem in accordance with aspects of the present disclosure, and provides context for the potential magnitude of differences between defined safety levels using representative pictures of air vehicles familiar to the user community.

FIG. 5 shows an example ecosystem 500 that may be one example of the ecosystem 100, or components thereof, described with reference to FIG. 1. The ecosystem 500 may schematically show that the platform's subsystems each have their own level of safety and the platform can manage those levels distinctly. The ecosystem 500 includes a schematic representation of different levels of security 1-5. The ecosystem 500 shown in FIG. 5 may be an example of a multi-level autonomy diagram that illustrates and summarizes multiple safety levels. Generally, FIG. 5 provides context for the potential magnitude of differences between defined safety levels using representative pictures of air vehicles familiar to the user community. FIG. 5 illustrates potential safety assignments ranging from less mature systems and software at safety level 2, to highly mature systems and software at safety level 5 that could have existing airworthiness approvals. The diagrams that follow in FIGS. 6-11 may be representative of example use cases related to the present disclosure.

The ecosystem 500 includes a plurality of vehicles or devices 205-a-f that are positioned or operable within one or more of the security levels 1-5. The security levels 1-5 may also be referred to as safety levels 1-5. Different numbers of security levels may included in ecosystem 500, such as 2-4 levels or more than 5 levels.

An Individual Safety Level (ISL) may be a safety level for functioning in the individual, autonomous vehicle/platform that is participating in a defined ecosystem. An Ecosystem Safety Level (ESL) may be a safety level required for vehicle/platform functionality in the defined ecosystem. Safe operation for a given vehicle 205-a-f requires that ISL=ESL. This equation can be met using approximate functionality on any participant in the ecosystem 500. ISL and ESL may be dynamically calculated to assess multiple factors. Such calculations may result in promoting the ISL and/or ESL to a higher security or safety level. The calculations may result in demotion of the ISL and/or ESL to a lower level of safety and/or security.

The ISL and ESL may be dynamically assessed factors related to, for example, health status, authority, capability, and environment, among others. The health status may include, for example, communication signal strength, built-in test results, and real-time vehicle performance. Authority may include, for example, team leader, team member, and lost communications. Capability may include, for example, a promotion/demotion enabled, maneuverability, sensors/payloads/weapons, and energy/fuel requirements and reserves. Environment may include, for example, altitude, desert or flat terrain, mountainous terrain, and atmospheric conditions and/or weather. The assessed factors may include component Technology Readiness Level (TRL) or existing safety certification. Assessed factors may include, for example, cybersecurity needs and human-in-the-loop/human-on-the-loop override capabilities.

Figure 6:
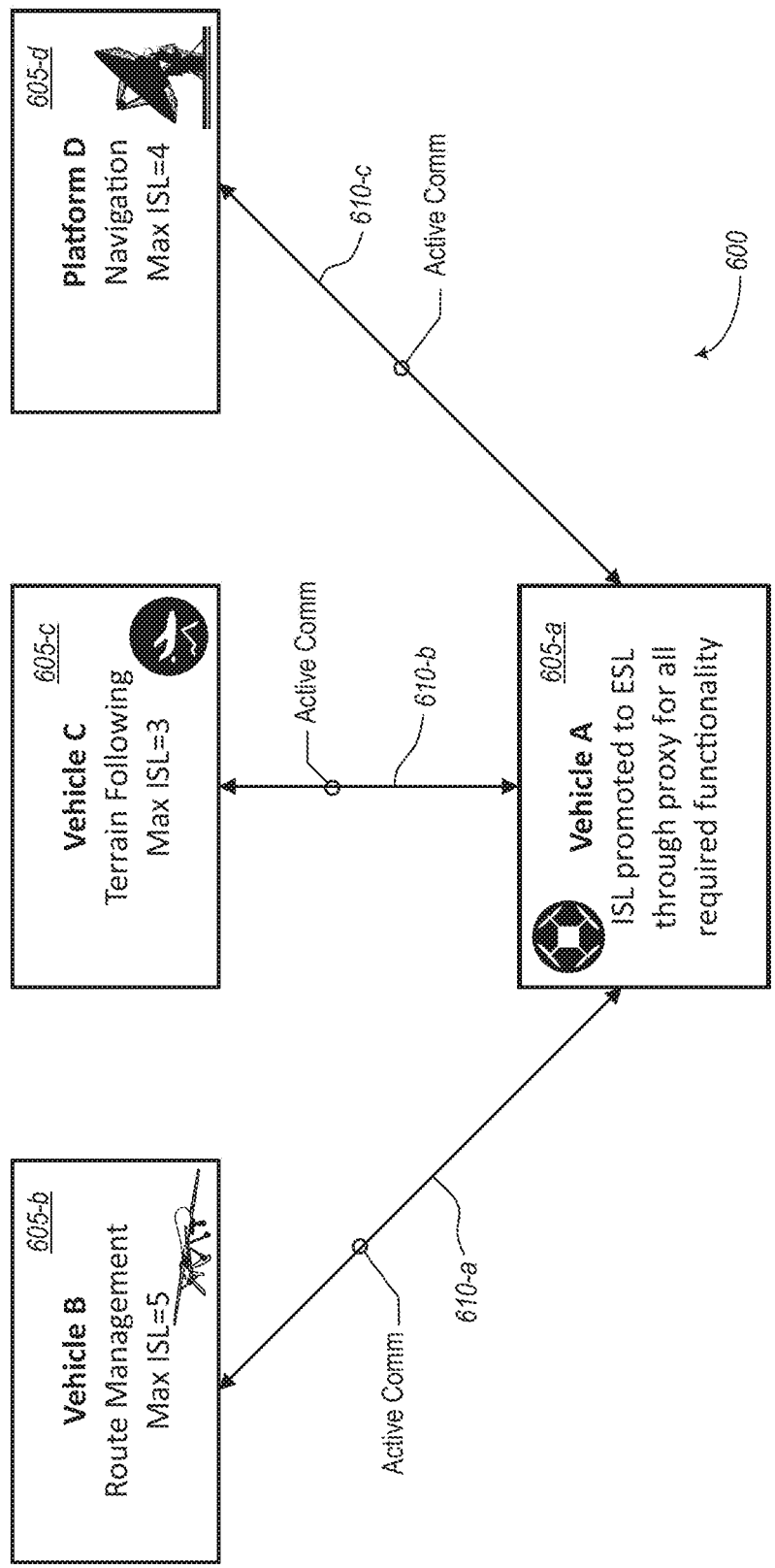
FIGS. 6 and 7 illustrate another example of a communications ecosystem in accordance with aspects of the present disclosure, and illustrate a network and data flow, respectively, of two air vehicles and a ground system that may allow for a vehicle with a low safety level to be promoted to a higher safety level.
Figure 7:
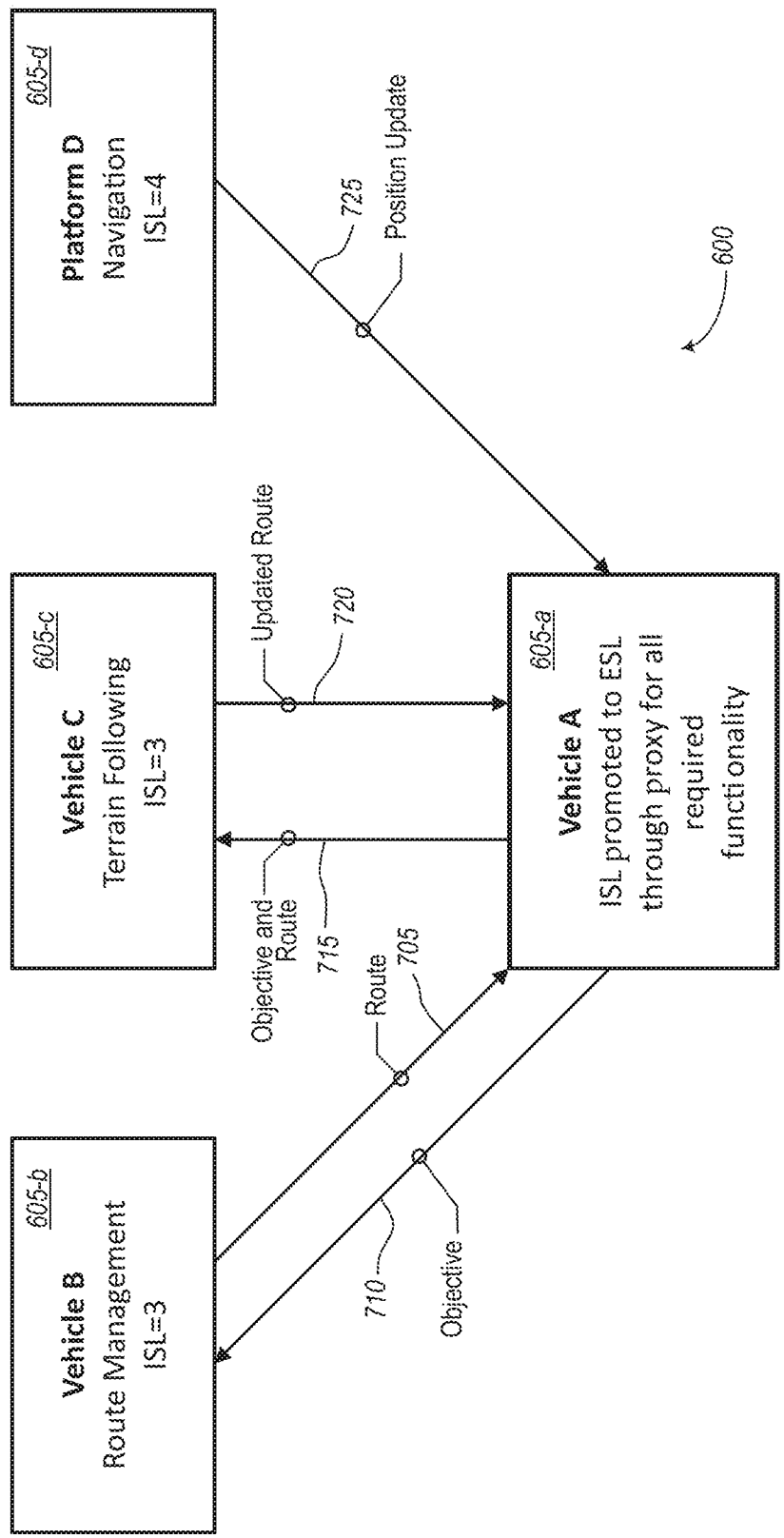

An example use case scenario is now described with reference to FIGS. 6 and 7 and Tables 1 and 2 included below. FIGS. 6 and 7 illustrate a network and data flow, respectively, of two air vehicles and a ground system that may allow for a vehicle with a low safety level to be promoted to a higher safety level. The safety level is promoted because members of the ecosystem not in direct contact with each other are collaborating to provide unique equipment and computational algorithm(s) integral to the ecosystem for autonomous operation, but not native to the promoted air vehicle.

In this scenario, an example ecosystem 600 is shown in FIG. 6 including a plurality of vehicle 605-a-d interconnected with active communications links 610-a-c. The ecosystem may be one example of the ecosystem 100, or components thereof, described with reference to FIG. 1.

As shown in Table 1, Vehicle A has a required ecosystem capability related to route management, terrain following and navigation. The Vehicle A Individual Safety Level (ISL) for route management is 1, for terrain following is 1, and for navigation is 2. Required Ecosystem Safety Level (ESL) for route management is 3, for terrain following is 3, and for navigation is 4. As a result, ISL=ESL for all required functionality related to route management, terrain following, and navigation.

In this scenario, Vehicle B has an ISL of 5 for route management capability, which relates to a Safe Airspace Volume (SAV) and Keep-it-safe Algorithm (KIA) on board. By providing an active communication link 610-a between Vehicles A and B, the ISL route management for Vehicle A is promoted to 3, which is the required ESL for route management for Vehicle A.

Vehicle C has an ISL of 4 for terrain following capabilities, which includes Digital Terrain Elevation Data (DTED) availability. Providing the active communication link 610-b between Vehicles A and C results in the ISL for terrain following capability for Vehicle A being promoted to 3, which is the required ESL for Vehicle A for terrain following.

Platform D has an ISL of 4 for radar position capabilities for navigation. Providing the active communication link 610-c between Vehicle A and Platform D results in the ISL for navigation for Vehicle A being promoted to 4, which is the required ESL for navigation for Vehicle A.

FIG. 7 shows a dataflow diagram for the scenario explained above with reference to FIG. 6 and Tables 1 and 2. FIG. 7 shows ecosystem 600 with vehicle 605-a-d representing Vehicles A-C and platform D. The dataflow includes transfer of route data 705 from Vehicle B to Vehicle A, and objective data 710 transferred from Vehicle A to Vehicle B. Objective and route data is transferred from Vehicle A to Vehicle C, and updated route data 720 is transferred from Vehicle C to Vehicle A. Position updates 725 are transferred from Platform D to Vehicle A.

TABLE 1

| Required Ecosystem Capability | Vehicle A Individual Safety Level (ISL) | Required Ecosystem Safety Level (ESL) |
| --- | --- | --- |
| Vehicle A - Route Management | 1 | 3 |
| Vehicle A - Terrain Following | 1 | 3 |
| Vehicle A - Navigation | 2 | 4 |

TABLE 2

| Scenario | Effect on Vehicle A |
| --- | --- |
| Vehicle A establishes communication with Vehicle B. Vehicle B has ISL = 5 Route Management capabilities (has a safe airspace volume - SAV - and keep-in-algorithm - KIA - onboard). | ISL Route Management promoted to 3 |
| Vehicle A establishes communication with Vehicle C. Vehicle C has ISL = 4 Terrain Following capabilities (has digital terrain database - DTED - available). | ISL Terrain Following promoted to 3 |
| Vehicle A establishes communication with Platform D. Platform D has ISL = 4 radar position capabilities for navigation. | ISL Navigation Promoted to 4 |

In some scenarios, the Vehicles A-C may be controlled at least in part by a ground station. Different levels of control (i.e., levels of interoperability (LOI)) may be used to provide this control. In these levels, some users can only control the payload of the vehicle (e.g., a camera) and some users can control the payload and change altitude, airspeed, and other aspects of the vehicle to, for example, obtain better views. The process of giving control to a user requires passing control during a specific time window. This may be done with a fixed schedule with times and unique participant identifiers preloaded on the air vehicle. When the ground control station operator hands control to one user, that user may be considered a supervised user because the ground control station operator will monitor the vehicle and can take back control from the user at any time with or without notification.

Other scenarios involve Remote Supervised User (RSU) technology. With the RSU, the supervised user can sublease her control to some other user that is not part of the pre-planned schedule. This may permit, for example, some other software to effectively send payload and aircraft steering comments because they networked to the "real" supervised user's software (i.e., the "real" supervised user sends commands on behalf of the remote user). In the example of FIGS. 6 and 7, the Vehicles A-C may be consider being supervised. Further, for example, Vehicle A may be considered being bolstered.

Figure 8:
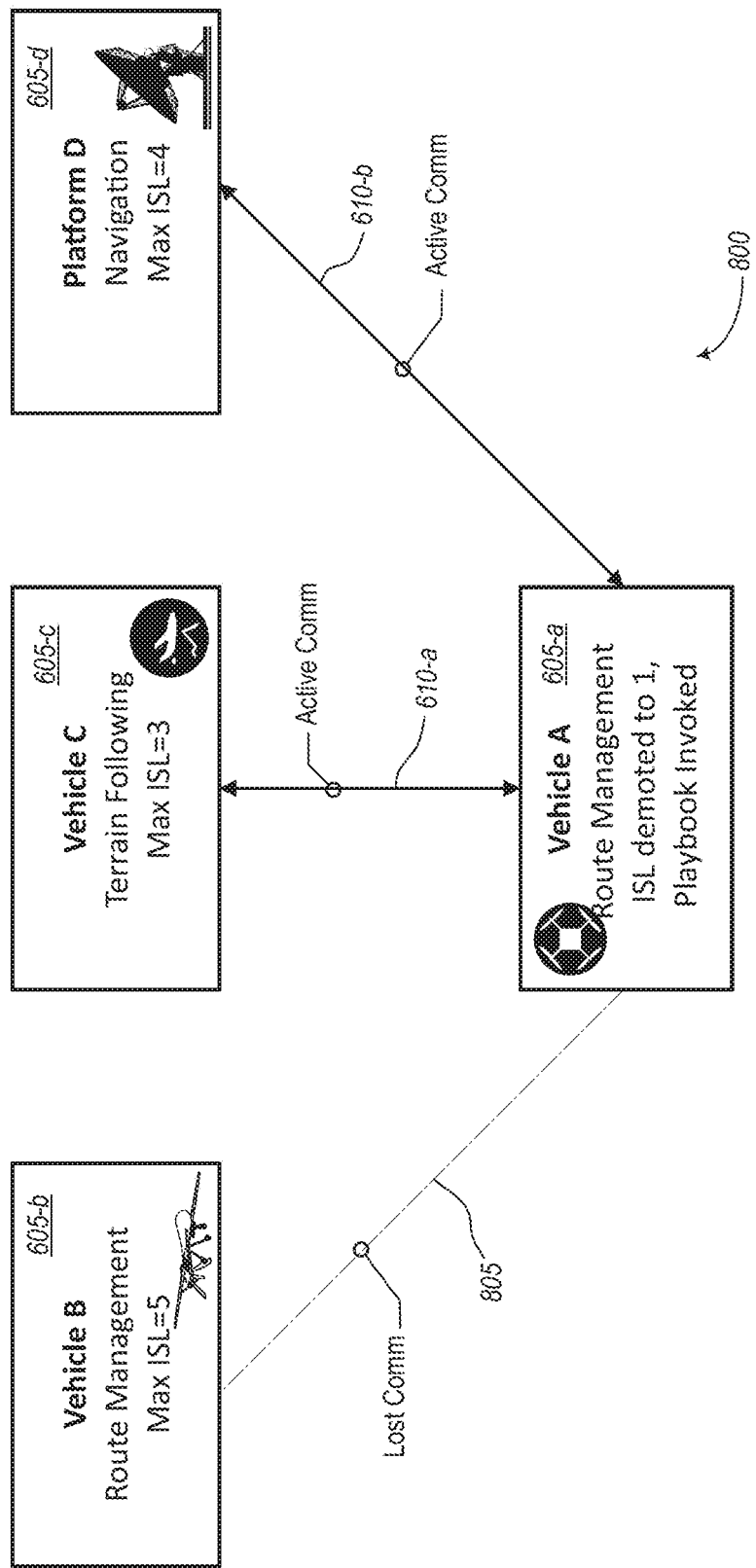
FIGS. 8 and 9 illustrate another example of a communications ecosystem in accordance with aspects of the present disclosure, and illustrate a network and data flow, respectively, of two air vehicles and a ground system that may allow for a vehicle with a low safety level to be promoted to a higher safety level and then demoted to a lower safety level because of a network disruption.
Figure 9:
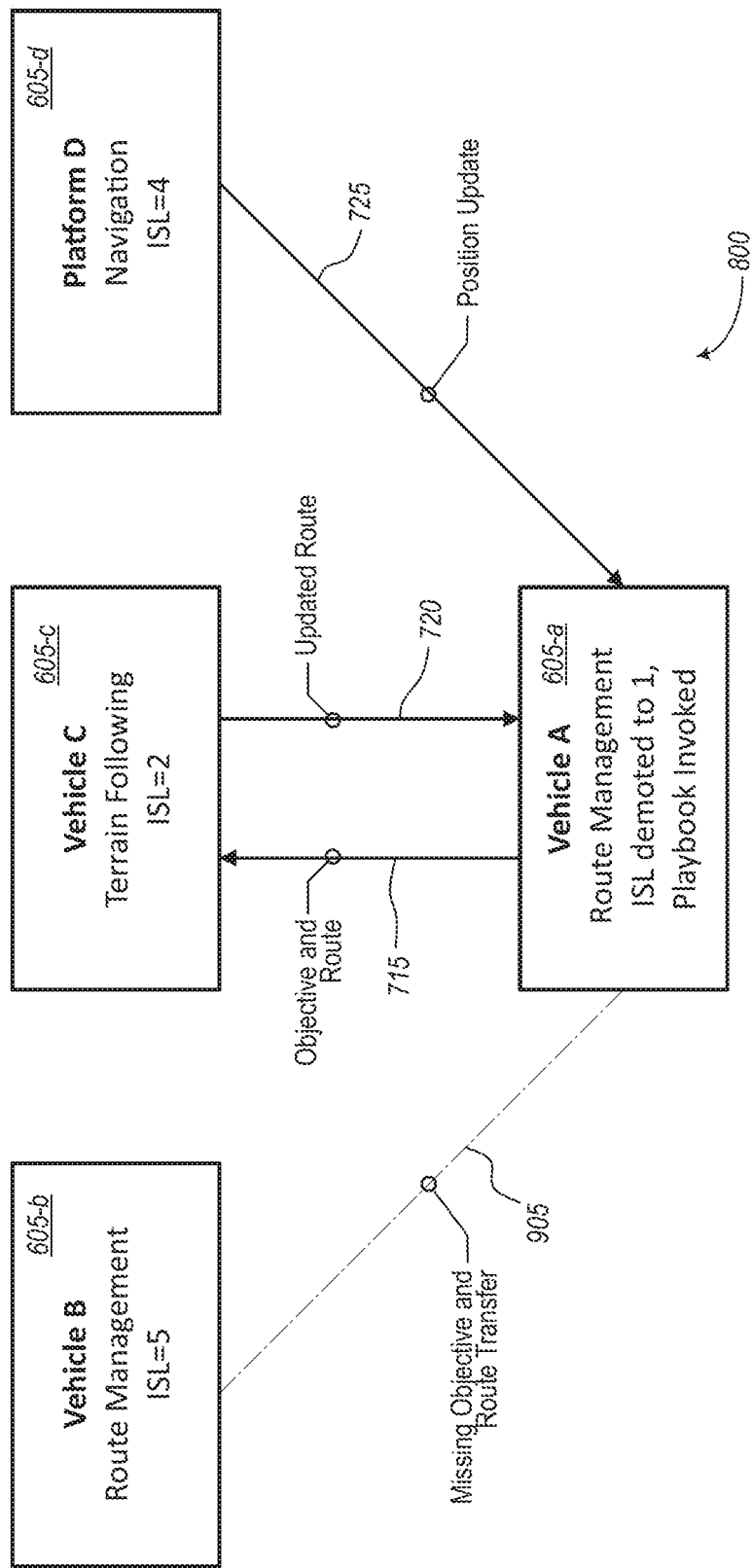

A second use case is now shown and described with reference to FIGS. 8 and 9 and Tables 3 and 4 shown below. FIGS. 8 and 9 illustrate a network and data flow, respectively, of two air vehicles and a ground system that may allow for a vehicle with a low safety level to be promoted to a higher safety level and then demoted to a lower safety level because of a network disruption. The safety level was originally promoted because members of the ecosystem were collaborating to provide unique equipment and computational algorithm(s) integral to the ecosystem for autonomous operation, but a loss of communications resulted in the invocation of a playbook operational scenario resident on the vehicle commensurate with the reduction in capabilities.

FIG. 8 shows ecosystem 800 that includes vehicles 605-a-d that represent Vehicles A-C and Platform D. The ecosystem 800 may be one example of the ecosystem 100, or components thereof, described with reference to FIG. 1. As shown in Table 3, Vehicle A has route management ISL of 1 and required ESL of 5, terrain following capability ISL of 1 and required ESL of 2, and navigation capability with ISL 2 and required ESL 4.

In this scenario, Vehicle B has an ISL of 5 and an ESL of 5 for route management capability, which may include a Safe Airspace Volume (SAV) and Keep-in-Algorithm (KIA) on board. Once a communication link is established between Vehicles A and B, the ISL route management for Vehicle A is promoted to 5, which is the required ESL for route management for Vehicle A.

Vehicle C has an ISL of 4 and an ESL of 3 related to terrain following capabilities, which includes Digital Terrain Elevation Data (DTED) availability. Once Vehicle A establishes the communication link with Vehicle C, the ISL for terrain following capability for Vehicle A is promoted to 2, which is the required ESL for terrain following for Vehicle A.

Platform D has an ISL of 4 and an ESL for 4 for radar position capabilities for navigation. Once Vehicle A establishes communication with Platform D, the ISL navigation for Vehicle A is promoted to 4, which is the required ESL for navigation for Vehicle A.

When Vehicle A loses communication with Vehicle B (lost communication 805), the ISL route management capability for Vehicle A is demoted to 1, which is the ISL for route management for Vehicle A.

FIG. 9 shows dataflow for the ecosystem 800 between the vehicles 605-a-d, which represent the Vehicles A-D and Platform D. In FIG. 9, the lost communications between Vehicles A and B result in missing objective and route transfer 905. As a result, a playbook is invoked for Vehicle A, and the ISL is demoted to 1. Objective and route data 715 is communicated from Vehicle A to Vehicle C, and an updated route data 720 is communicated from Vehicle C to Vehicle A. Position update data 725 is communicated from Platform D to Vehicle A as in the scenario described above with reference to FIGS. 6 and 7.

TABLE 3

| Required Ecosystem Capability | Vehicle A Individual Safety Level (ISL) | Required Ecosystem Safety Level (ESL) |
|---|---|---|
| Vehicle A - Route Management | 1 | 5 |
| Vehicle A - Terrain Following | 1 | 2 |
| Vehicle A - Navigation | 2 | 4 |

TABLE 4

| Scenario | Effect on Vehicle A |
|---|---|
| Vehicle A establishes communication with Vehicle B. Vehicle B has ISL = 5/ESL = 5 Route Management capabilities (has a safe airspace volume - SAV - and keep-in-algorithm - KIA - onboard). | ISL Route Management promoted to 5 |
| Vehicle A establishes communication with Vehicle C. | ISL Terrain |

TABLE 4-continued

| Scenario | Effect on Vehicle A |
|---|---|
| Vehicle C has ISL = 4/ESL = 3 Terrain Following capabilities (has digital terrain database - DTED - available). | Following promoted to 2 |
| Vehicle A establishes communication with Platform D. Platform D has ISL = 4/ESL = 4 radar position capabilities for navigation. | ISL Navigation Promoted to 4 |
| Vehicle A loses communication with Vehicle B. | ISL Route Management demoted to 1, playbook invoked |

Generally, the playbook concept is used to identify a tangible safety "relief valve" or "emergency procedure" that is resident on the vehicle in the event there was a degradation that results in a demotion. The playbook may provide for a plan such as "if this happens then do the following . . . ", and/or "if these things happen, then do the following . . . ", based on what may be appropriate for the vehicle, scenario, and/or environment. For example, the evasive actions can range from simple actions for the vehicle like climbing to something more significant like crashing itself (i.e., for an air vehicle) or brakes on, motor off (e.g., for a ground vehicle). There could be different playbooks for the same scenarios in different environments (e.g., different playbooks for sparsely populated areas verses densely populated areas, desert versus mountainous region, and so on). One use case for the playbook could be that a human operator takes back control of the vehicle and overrides the automation. In this case, the playbook resident on the vehicle is simply the override logic, and the implementer of the playbook may have a choice.

Figure 10:
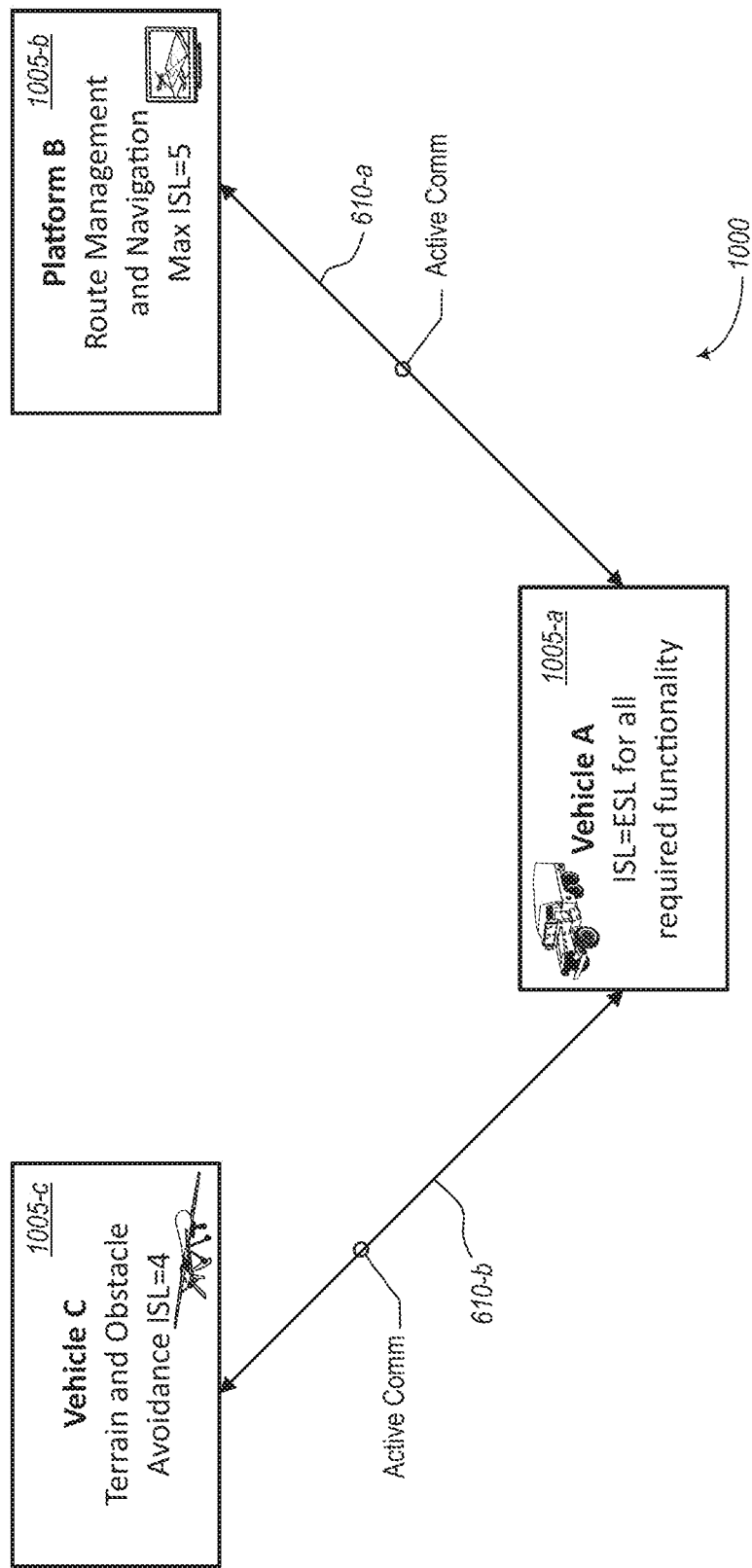
FIGS. 10 and 11 illustrate another example of a communications ecosystem in accordance with aspects of the present disclosure, and illustrate a network and data flow, respectively, of two air vehicles and a ground vehicle that may allow for a ground vehicle with a low safety level to be promoted to a higher safety level.
Figure 11:
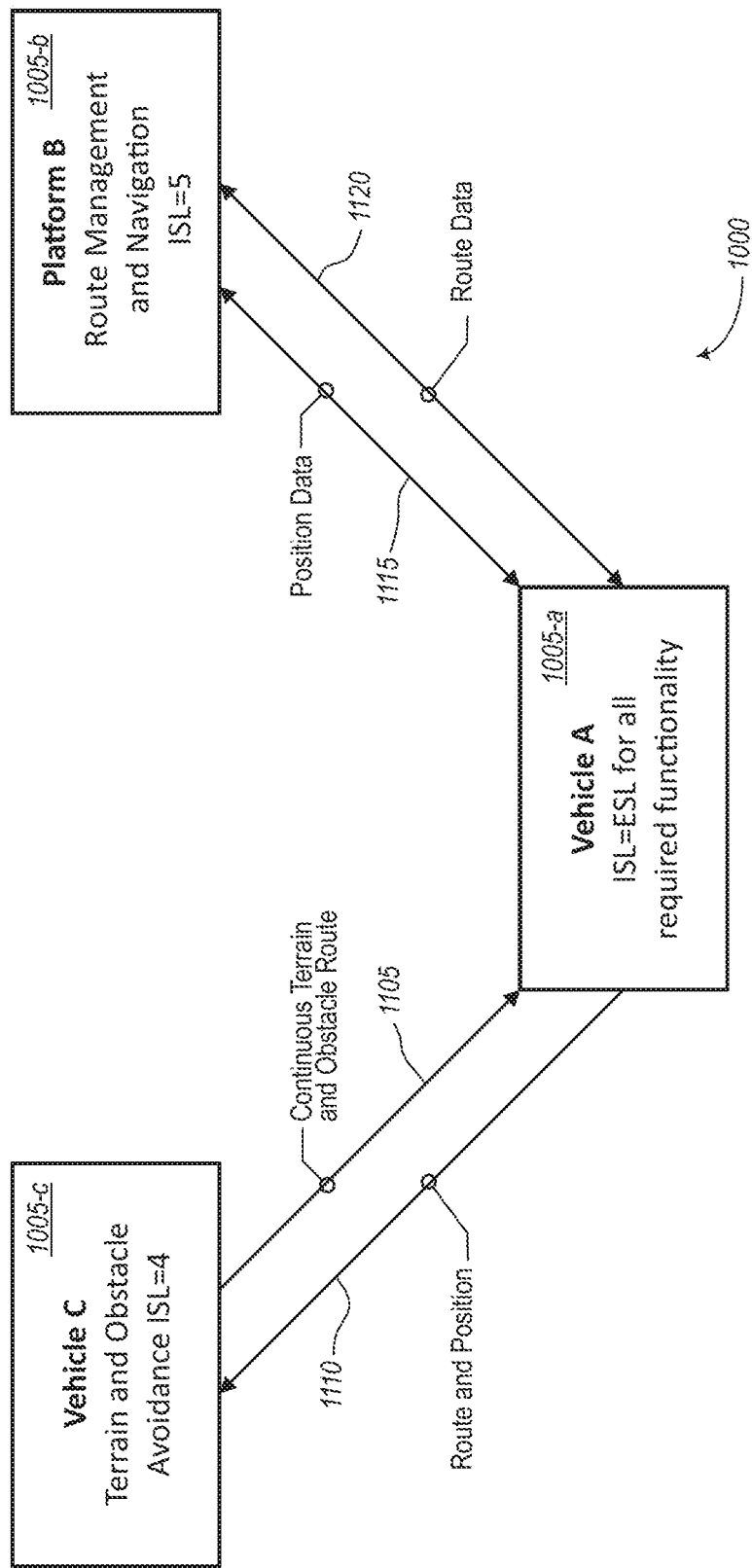

A third use case is now described with reference to FIGS. 10 and 11 and Tables 5 and 6 shown below. FIGS. 10 and 11 illustrate a network and data flow, respectively, of two air vehicles and a ground vehicle that may allow for a ground vehicle with a low safety level to be promoted to a higher safety level. The safety level is promoted because members of the ecosystem provide unique equipment and computational algorithm(s) integral to the ecosystem for autonomous operation, but not native to the ground vehicle.

In this third use case scenario, an ecosystem 1000 is shown in FIG. 10 to include vehicles 105-a-c, which represent Vehicles A and C and Platform B. The ecosystem 1000 may be one example of the ecosystem 100, or components thereof, described with reference to FIG. 1.

As shown in Table 1, Vehicle A has route management ISL of 3 and required ESL of 4, terrain and obstacle avoidance capability ISL of 0 and required ESL 4, and navigation capability of ISL 2 and required ESL 4. As shown in Table 6, Platform B has an ISL of 5 for route management and an ISL of 5 for navigation capabilities, which may include ground station with human calculated route and position monitoring. When a communications link 610-a is established between Vehicle A and Platform B, the ISL for route management for Vehicle A is promoted to 4 and navigation is promoted to 4 for Vehicle A.

Vehicle C has an ISL of 4 for terrain following capabilities, which may include Digital Terrain Elevation Data (DTED) and Laser Radar (LIDAR) availability. When Vehicle A establishes a communications link with Vehicle C, the ISL terrain following capabilities for Vehicle A are promoted to 4.

FIG. 11 shows the ecosystem 1000 with dataflow between the vehicles 1005-a-c. Position data 1115 is provided between the Vehicle A and Platform B, and route data is also communicated between Vehicle A and Platform B. Continuous terrain and obstacle route data 1105 is communicated from Vehicle C to Vehicle A, and route and position data 1110 is communicated from Vehicle A to Vehicle C.

TABLE 5

| Required Ecosystem Capability | Vehicle A Individual Safety Level (ISL) | Required Ecosystem Safety Level (ESL) |
|---|---|---|
| Vehicle A - Route Management | 3 | 4 |
| Vehicle A - Terrain and Obstacle Avoidance | 0 | 4 |
| Vehicle A - Navigation | 2 | 4 |

TABLE 6

| Scenario | Effect on Vehicle A |
|---|---|
| Vehicle A establishes communications with Platform B. Platform B has ISL = 5 Route Management and Navigation capabilities (Ground station with human calculated route and position monitoring). | ISL Route Management promoted to 4 and ISL Navigation promoted to 4 |
| Vehicle A establishes communications with Vehicle C. Vehicle C has ISL = 4 Terrain Following capabilities (has digital terrain database - DTED - and Laser Radar - LIDAR - available). | ISL Terrain Following promoted to 4 |

Figure 12:
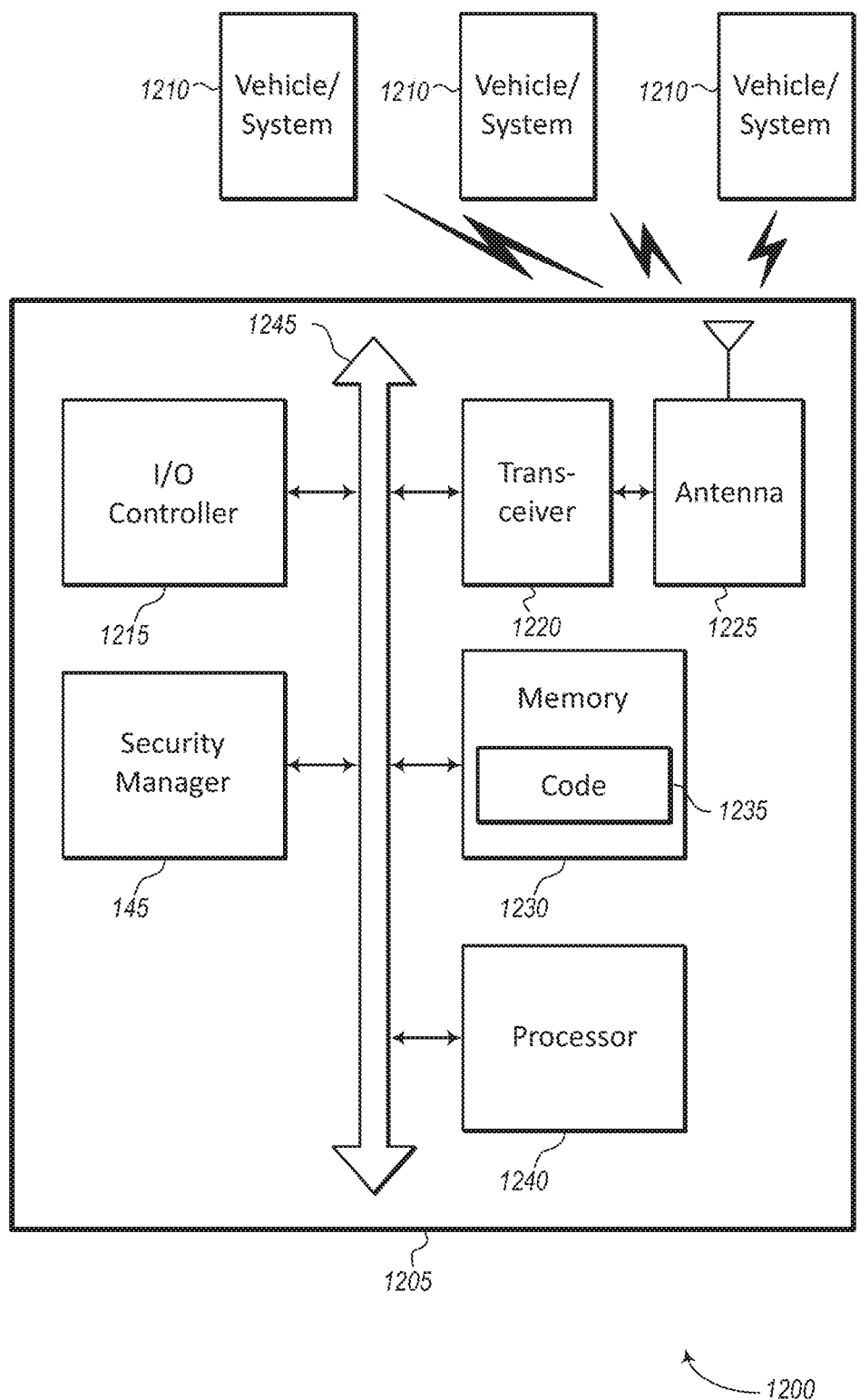
FIG. 12 shows a diagram of a system including a device that provides for secure communications within a communications ecosystem in accordance with aspects of the present disclosure.

FIG. 12 shows a diagram of a system 1200 including a device 1205 that supports dynamic accessibility compliance of a website in accordance with aspects of the present disclosure. The device 1205 may be an example of or include the components of device 105, or other devices as described herein. The device 1205 may include components for transmitting and receiving communications, including a security manager 145, an I/O controller 1215, a transceiver 1220, an antenna 1225, memory 1230, and a processor 1240. These components may be in electronic communication via one or more buses (e.g., bus 1245).

The security manager 145 may provide at least some of the functionality related to the ecosystems 100-1000 described above with reference to FIGS. 2-11. For example, the security manager 145 may monitor the ISL and ESL for one or more vehicles and/or systems 1210 of a given ecosystem and upgrade or downgrade the security level based on a variety of conditions, communications links, etc. The security manager 145 may monitor communications between the vehicles/systems 1210 and device 1205 or other components of the system 1200.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-dOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM and ROM. The memory 1230 may store computer-readable, computer-executable code 1235 including instructions that, when executed, cause the processor to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting dynamic accessibility compliance of a website).

The code 1235 may include instructions to implement aspects of the present disclosure, including instructions to support dynamic accessibility compliance of a website. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
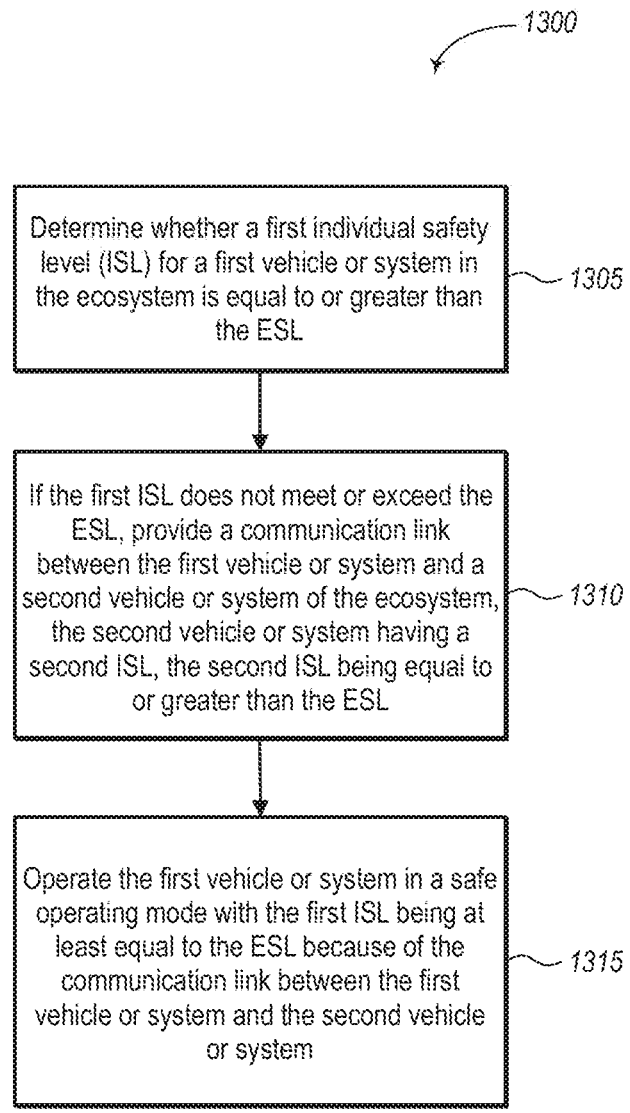
FIG. 13 shows a flow chart illustrating an example method in accordance with aspects of the present disclosure.

FIG. 13 shows a flowchart illustrating a method 1300 method for secure communications within a defined communications ecosystem in accordance with aspects of the present disclosure. The ecosystem has an ecosystem safety level (ESL), and a plurality of vehicles or systems existing in the ecosystem. The operations of method 1300 may be implemented by a device or its components as described herein. For example, the operations of method 1300 may be performed by a security manager 145 as described with reference to FIG. 1. In some examples, a device may execute a set of instructions to control the functional elements of the device to perform the functions described herein. Additionally or alternatively, a device may perform aspects of the functions described herein using special-purpose hardware.

At 1305, the method 1300 includes determining whether a first individual safety level (ISL) for a first vehicle or system in the ecosystem is equal to or greater than the ESL. At 1310, the method 1300 includes determining if the first ISL does not meet or exceed the ESL, and providing a communication link between the first vehicle or system and a second vehicle or system of the ecosystem, the second vehicle or system having a second ISL, and the second ISL being equal to or greater than the ESL. At 1315, the method 1300 includes operating the first vehicle or system in a safe operating mode with the first ISL being at least equal to the ESL because of the communication link between the first vehicle or system and the second vehicle or system.

The method 1300 may further include at least periodically recalculating the first ISL, the second ISL and the ESL, and modifying the communication link if the first ISL becomes equal to or greater than the ESL, or the second ISL becomes less than the ESL.

The ESL may be based on at least one of operating conditions, needs, capabilities, terrain, restrictions, and availability. The method 1300 may include automatically disconnecting the communication link if the ESL is lower than or equal to the first ISL. The method 1300 may include invoking a predetermined action for the first vehicle or system if the first ISL does not meet or exceed the ESL then the communication link is not created. The method 1300 may include determining the first ISL using at least one of health status, authority, capability, and environment capabilities for the ecosystem.

The health status may include at least one of communication signal strength, built-in test results, and real-time vehicle performance. Authority may include at least one of team leader status, team member status, and lost communication status. Capability may include at least one of promotion/demotion enabled, maneuverability, sensor/payback/weapons, and energy/fuel requirements and reserves. Environment may include at least one of altitude, climate or terrain, and atmospheric conditions or weather.

It should be noted that the methods described herein describe possible implementations, and that the operations and the steps may be rearranged or otherwise modified and that other implementations are possible. Furthermore, aspects from two or more of the methods may be combined.

The IMSAFE architecture may enable AI/ML algorithms to be used on cost effective UAS platforms in numerous applications that directly or indirectly improve the quality of life for the civilian and military population may create a niche in the marketplace. With IMSAFE architecture, it is, for example, possible to develop a single ground-based (or air and ground combination) safety-critical system to be sold to third parties that allow them to purchase and/or develop low cost UASs with whatever non-deterministic AI/ML algorithms meet their business needs and continually upgrade/improve their UAS fleet without having to go through a lengthy and expensive certification process each time. IMSAFE architecture may be implement in such a way that a safety-critical system (or network of systems) can be developed that allows customers to execute safe, autonomous flight using a subscription-based revenue model. In this case, if licensed, the customer's UAS can participate in the multi-level safety environment. A subscription based model may allow for more customers since the barrier to entry for smaller delivery companies competing with larger companies is reduced since the smaller company can purchase a subscription for a smaller fleet of custom UASs without needing capital to develop and certify their own system that allows them to fly in the NAS.

Because of the maturity and acceptance of UAS delivery, an initial product offering in this market makes sense. As the Department of Defense, for example, continues to research and implement AI/ML solutions for UASs in the battle field that need autonomous targeting and weapons release, the IMSAFE architecture may provide a competitive advantage for winning future military contracts since the UAS's role in MUM-T cannot be expanded to autonomous attack operations in communication denied environments without solving the airworthiness certification problem. With commercial space flight solutions maturing to higher readiness levels and the introduction of, for example, the U.S. Space Force, the market for safe, low-cost unmanned vehicle operations will likely transition into orbit at a future date.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for secure communications within a defined communications ecosystem, the ecosystem having an ecosystem safety level (ESL), a plurality of vehicles or systems existing in the ecosystem, the method comprising:
   determining whether a first individual safety level (ISL) for a first vehicle or system in the ecosystem is equal to or greater than the ESL;
   if the first ISL does not meet or exceed the ESL, providing a communication link between the first vehicle or system and a second vehicle or system of the ecosystem, the second vehicle or system having a second ISL, the second ISL being equal to or greater than the ESL;
   operating the first vehicle or system in a safe operating mode with the first ISL being at least equal to the ESL because of the communication link between the first vehicle or system and the second vehicle or system;
   at least periodically recalculating the first ISL, the second ISL, and the ESL; and
   modifying the communication link if the first ISL becomes equal to or greater than the ESL, or the second ISL becomes less than the ESL.

2. The method of claim 1, wherein:
   the Ecosystem Safety Level (ESL) is based on at least one of operating conditions, needs, capabilities, terrain, restrictions, and availability.

3. The method of claim 1, further comprising:
   automatically disconnecting the communication link if the ESL is equal to or less than the first ISL.

4. The method of claim 1, further comprising:
   invoking a predetermined action for the first vehicle or system if the first ISL does not meet or exceed the ESL and the communication link is not created.

5. The method of claim 1, further comprising:
   determining the first ISL using at least one of health status, authority, capability, and environment.

6. The method of claim 1, wherein:
   health status includes at least one of communication signal strength, built-in-test results, and real-time vehicle performance;
   authority includes at least one of team leader status, team member status, lost communications status;
   capability includes at least one of promotion/demotion enabled, maneuverability, sensor/payload/weapons, and energy/fuel requirements and reserves;
   environment includes at least one of altitude, climate or terrain, and atmospheric conditions/weather.

7. A communications ecosystem, comprising:
   an ecosystem safety level (ESL);
   a plurality of vehicles or systems, each vehicle or system having an individual safety level (ISL);
   a control system operable to determine whether the ISL for each vehicle or system meets or exceeds the ESL; and
   one or more communications links between any first vehicle or system having a first ISL that does not meet or exceed the ESL and a second vehicle or system with a second ISL that does meet or exceed the ESL such that the first vehicle or system operates at the second ISL;
   wherein the communications ecosystem may be operated in a safe operating mode with the first ISL being at least equal to the ESL because of the communication link between the first vehicle or system and the second vehicle or system, with the first ISL, the second ISL, and the ESL being recalculated at least periodically; and wherein the communication link may be modified if the first ISL becomes equal to or greater than the ESL, or the second ISL becomes less than the ESL.

8. The ecosystem of claim 7, further comprising:
   a human override capability that controls the one or more communications links.

9. The ecosystem of claim 8, further comprising:
   a controller configured to determine when to create or eliminate the one or more communications links based on a real-time status of the ESL and the first and second ISLs.

10. The ecosystem of claim 8, wherein:
    the ESL and the first and second ISLs are independently variable, and the one or more communications links are automatically controlled based on real-time comparisons of the ESL with the first and second ISLs.

11. The ecosystem of claim 7, wherein:
    the first vehicle or system operates based on one or more predetermined conditions when disconnected from the second vehicle or system.

12. A communications system, comprising:
a first ecosystem having a first ecosystem safety level (ESL);
a second ecosystem having a second ESL:
a first vehicle or system having a first individual safety level (ISL), the first ISL being less than the first ESL;
a second vehicle or system having a second ISL, the second ISL being equal to or greater than the first ESL; and
a first communications link between the first vehicle or system and the second vehicle or system that promotes the first ISL to be equal to the second ISL to provide safe operation of the first vehicle or system in the first ecosystem;
wherein the communications system may be operated in a safe operating mode with the first ISL being at least equal to the ESL because of the communication link between the first vehicle or system and the second vehicle or system, with the first ISL, the second ISL, and the ESL being recalculated at least periodically; and wherein the communication link may be modified if the first ISL becomes equal to or greater than the ESL, or the second ISL becomes less than the ESL.

13. The system of claim 12, further comprising:
a third vehicle or system having a third ISL, the third ISL being equal to or greater than the second ESL;
a second communications link between the first vehicle or system and the third vehicle or system that promotes the first ISL to be equal to the third ISL to provide safe operation of the first vehicle or system in the second ecosystem.

14. The system of claim 12, wherein:
the first communications link is disconnected if the first ISL increases to be equal to or greater than the first ESL or the second ISL drops below the first ESL.

15. The system of claim 12, wherein:
wherein the second communications link is disconnected if the first ISL increases to be equal to or greater than the second ESL or the third ISL drops below the second ESL.

* * * * *